(12) United States Patent
Pildysh

(10) Patent No.: US 7,615,093 B2
(45) Date of Patent: Nov. 10, 2009

(54) CONTROLLED RELEASE PRODUCT AND METHOD FOR THE PRODUCTION THEREOF

(75) Inventor: Mikhail Pildysh, Calgary (CA)

(73) Assignee: Beachpoint Holdings Inc., Elkford (CA)

( * ) Notice: Subject to any disclaimer, the term of this patent is extended or adjusted under 35 U.S.C. 154(b) by 453 days.

(21) Appl. No.: 11/616,500

(22) Filed: Dec. 27, 2006

(65) Prior Publication Data

US 2007/0110783 A1    May 17, 2007

Related U.S. Application Data

(62) Division of application No. 10/220,942, filed as application No. PCT/CA01/00301 on Mar. 8, 2001, now Pat. No. 7,189,275.

(30) Foreign Application Priority Data

Mar. 9, 2000    (CA) ................................. 2300237

(51) Int. Cl.
    A01N 25/12    (2006.01)
(52) U.S. Cl. .................. 71/64.11; 71/31; 71/62
(58) Field of Classification Search ........... 71/64.11, 71/31, 62
    See application file for complete search history.

(56) References Cited

U.S. PATENT DOCUMENTS

| | | |
|---|---|---|
| 3,979,198 A | 9/1976 | Bardsley |
| 3,991,225 A | 11/1976 | Blouin |
| 3,997,355 A | 12/1976 | Santucci et al. |
| 3,997,356 A | 12/1976 | Thurn et al. |
| 4,026,719 A | 5/1977 | Simic |
| 4,067,141 A | 1/1978 | Matsunaga et al. |
| 4,106,926 A | 8/1978 | Thomas |
| 4,111,684 A | 9/1978 | Thomas et al. |
| 4,129,453 A | 12/1978 | Simic |
| 4,133,668 A | 1/1979 | Young |
| 4,282,040 A | 8/1981 | Schneider |
| 4,285,853 A | 8/1981 | Schreiber |
| 4,309,996 A | 1/1982 | Theeuwes |
| 4,411,683 A | 10/1983 | Goertz |
| 4,484,950 A | 11/1984 | Hinkebein |
| 4,493,725 A | 1/1985 | Moon et al. |
| 4,565,564 A | 1/1986 | Backlund |
| 4,589,903 A | 5/1986 | Sato et al. |
| 4,610,715 A | 9/1986 | Monaldi et al. |
| 4,636,242 A | 1/1987 | Timmons |
| 4,676,821 A | 6/1987 | Gullett et al. |
| 4,698,372 A | 10/1987 | Moss |
| 4,711,659 A | 12/1987 | Moore |
| 4,804,403 A | 2/1989 | Moore |
| 4,857,098 A | 8/1989 | Shirley, Jr. |
| 4,975,108 A | 12/1990 | Pruitt |
| 5,019,564 A | 5/1991 | Lowe et al. |
| 5,030,267 A | 7/1991 | Vinaty et al. |
| 5,046,730 A | 9/1991 | Golden et al. |
| 5,112,379 A | 5/1992 | Young |
| 5,219,465 A | 6/1993 | Goertz et al. |
| 5,228,895 A | 7/1993 | Kelly et al. |
| 5,317,037 A | 5/1994 | Golden et al. |
| 5,364,627 A | 11/1994 | Song |
| 5,374,292 A | 12/1994 | Detrick et al. |
| 5,451,242 A | 9/1995 | Ming et al. |
| 5,471,786 A | 12/1995 | Clausen |
| 5,514,430 A | 5/1996 | Andersen et al. |
| 5,599,374 A | 2/1997 | Detrick |
| 5,628,813 A | 5/1997 | Chen et al. |
| 5,653,782 A | 8/1997 | Stern et al. |
| 5,679,129 A | 10/1997 | Hon |
| 5,730,773 A | 3/1998 | Farley |
| 5,762,678 A | 6/1998 | Hiles |
| 5,795,377 A | 8/1998 | Tanner et al. |
| 5,849,060 A | 12/1998 | Diping et al. |
| 5,851,261 A | 12/1998 | Markusch et al. |
| 5,939,356 A | 8/1999 | Wellinghoff |

FOREIGN PATENT DOCUMENTS

EP    0 310 100    4/1989

*Primary Examiner*—C. Sayala
(74) *Attorney, Agent, or Firm*—Rodman & Rodman; Terrence Kuharchuk

(57) ABSTRACT

A controlled release product and a method for producing the controlled release product. The product includes a substrate material for release to a surrounding environment and a composition coating the substrate material in a coating layer for providing a controlled release of the substrate material. The composition includes a matrix material; a particulate fibrous filler material dispersed throughout the matrix material and a water soluble surface treatment material applied to the external surfaces of the particles of filler material such that the surface treatment material provides degradable interfaces between the matrix material and the external surfaces of the particles of filler material, and wherein the degradable interfaces are degradable in the presence of water such that interfacial passageways between the matrix material and the external surfaces of the particles of filler material are formed by the dissolution of the surface treatment material.

56 Claims, 7 Drawing Sheets

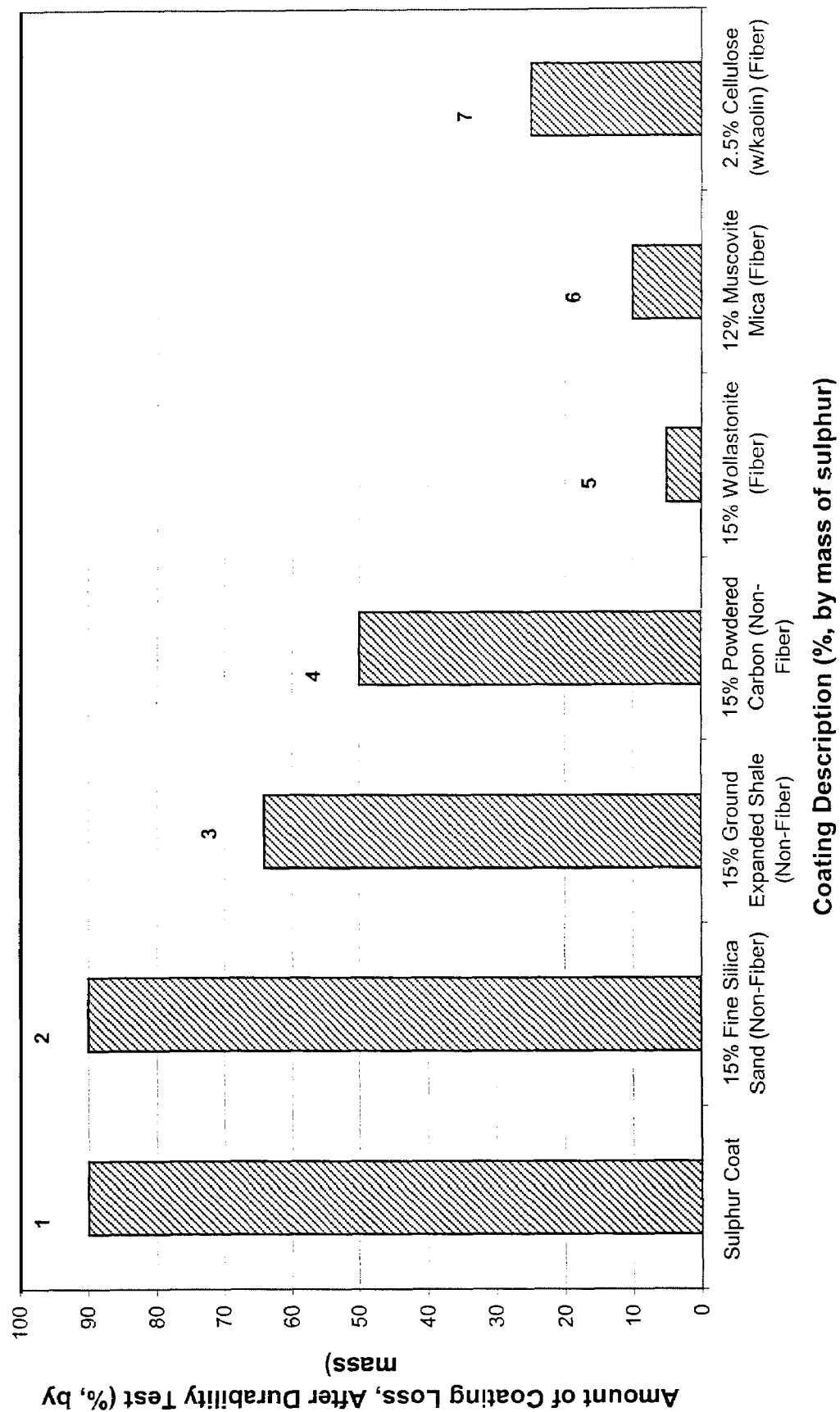

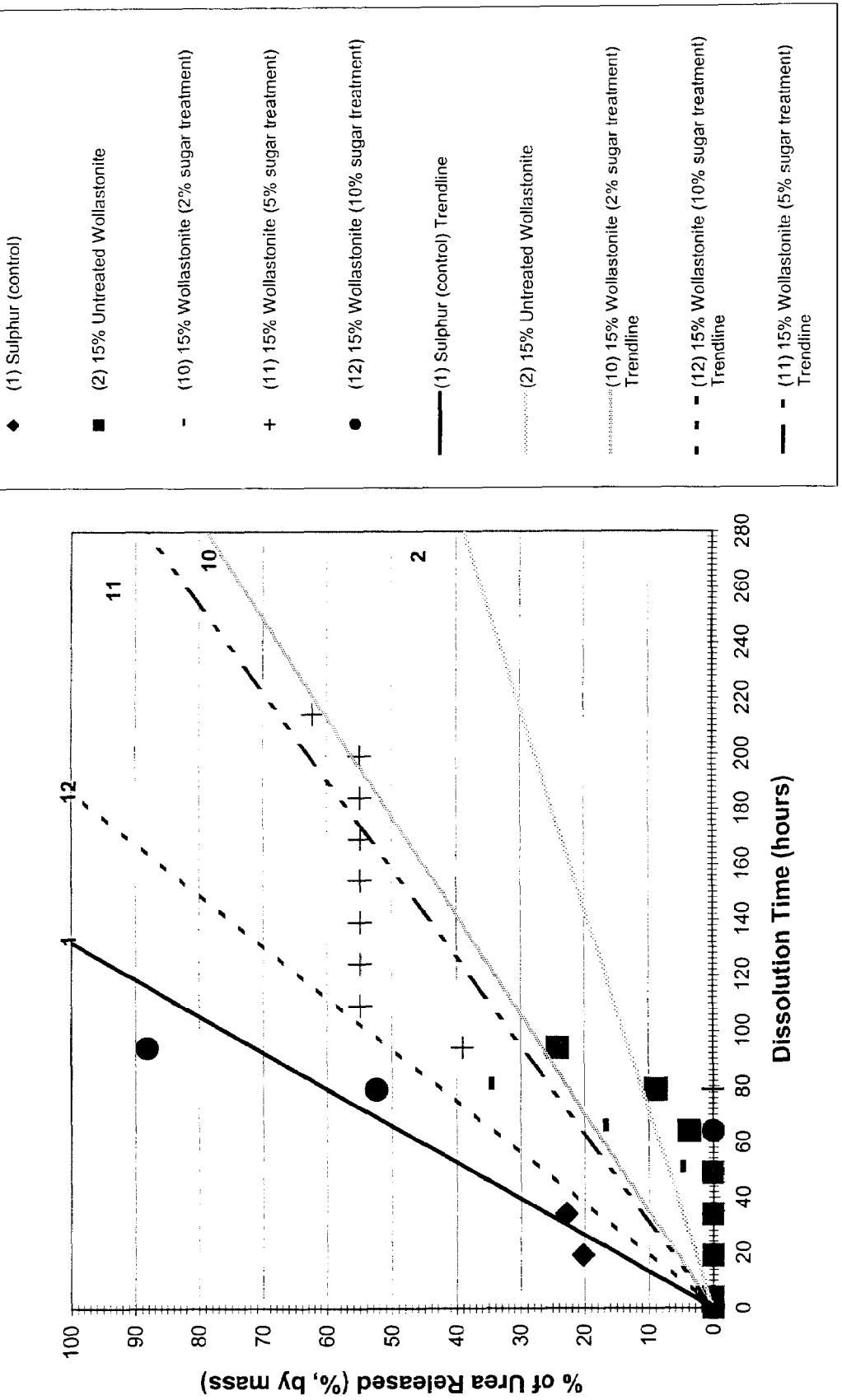
FIGURE 2: Release Profiles for Surface Treated Wollastonite (SugarTreatment Series)

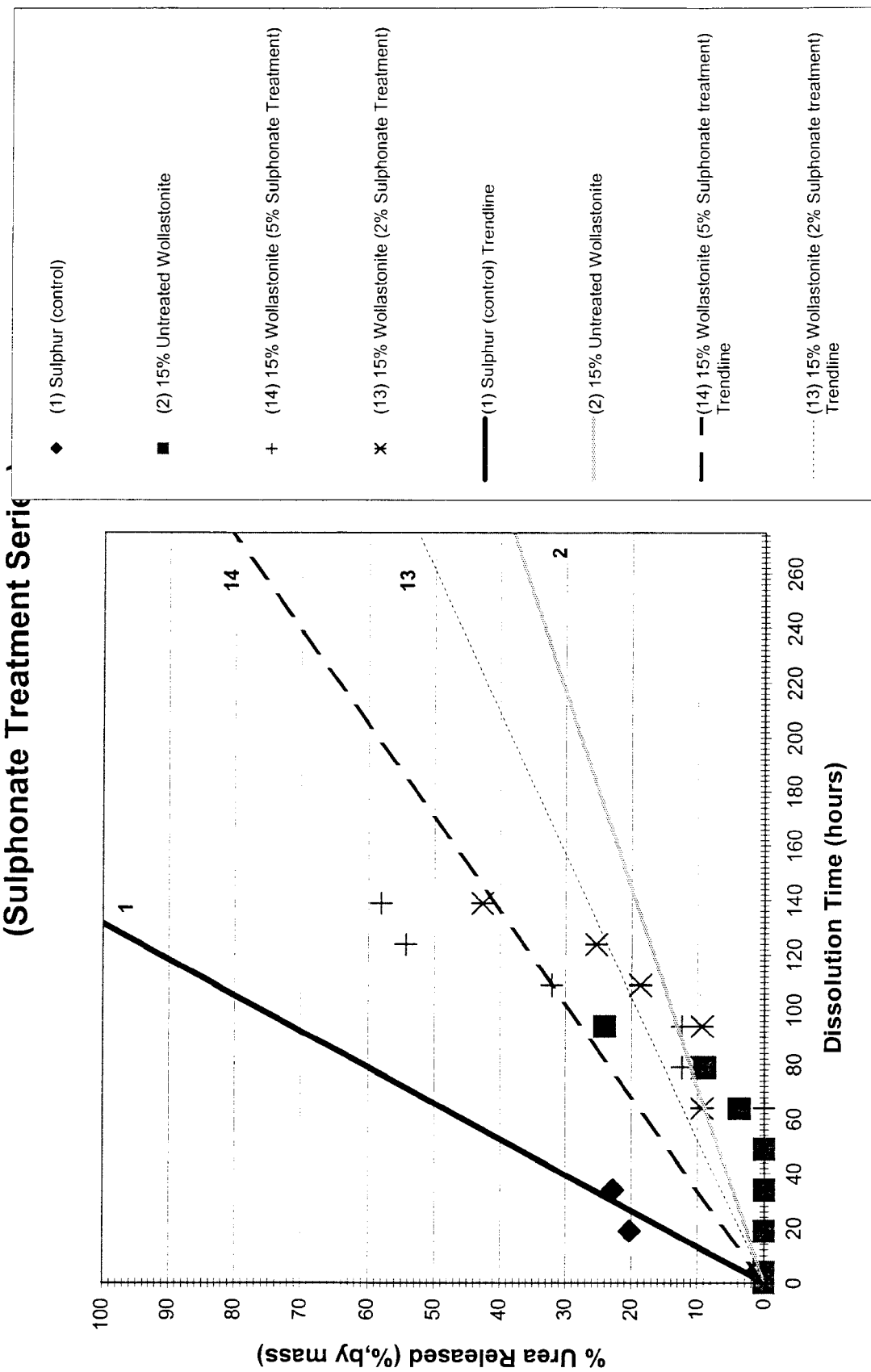

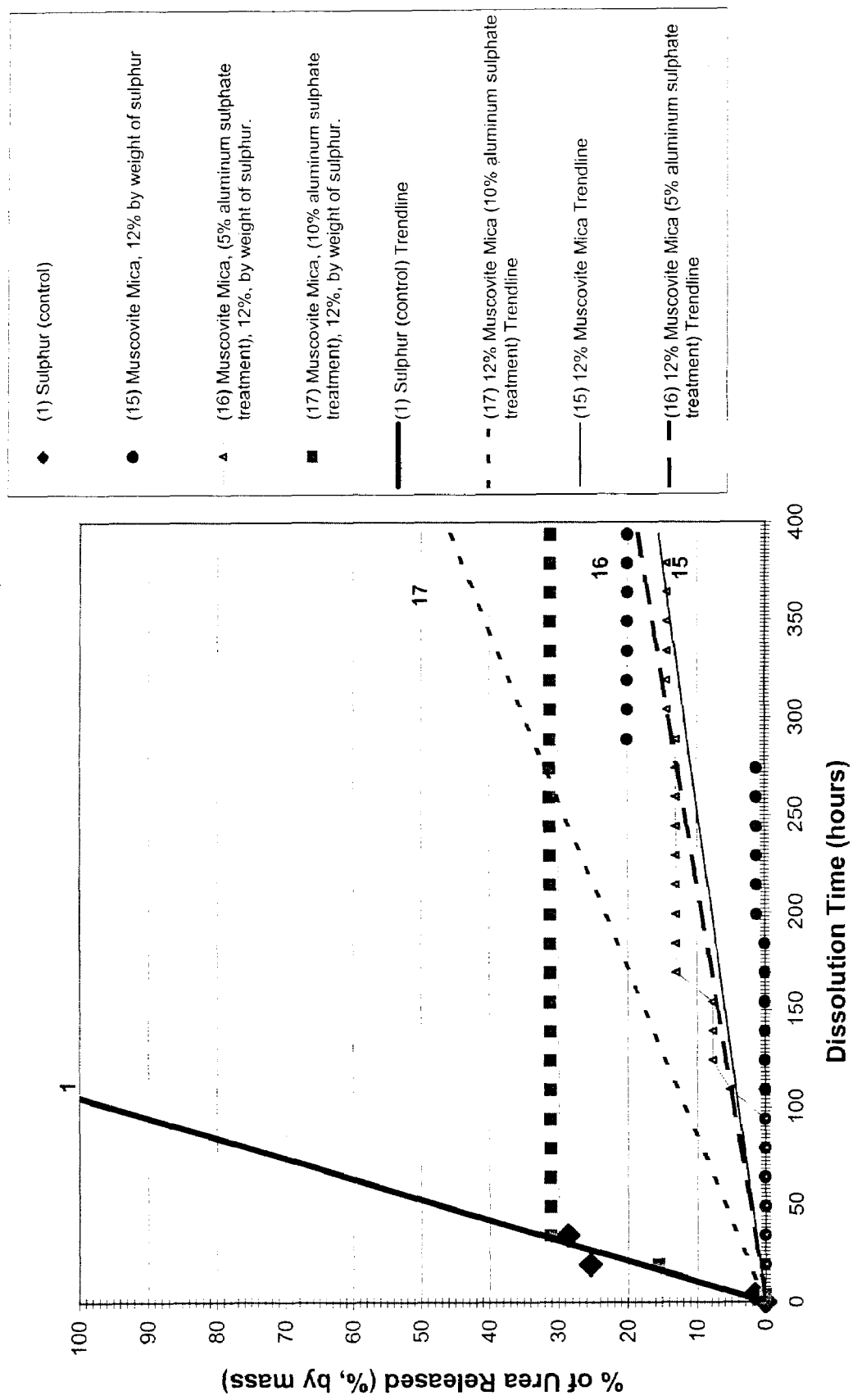
FIGURE 4: Release Profiles for Surface Treated Mica (Aluminum Sulphate Series)

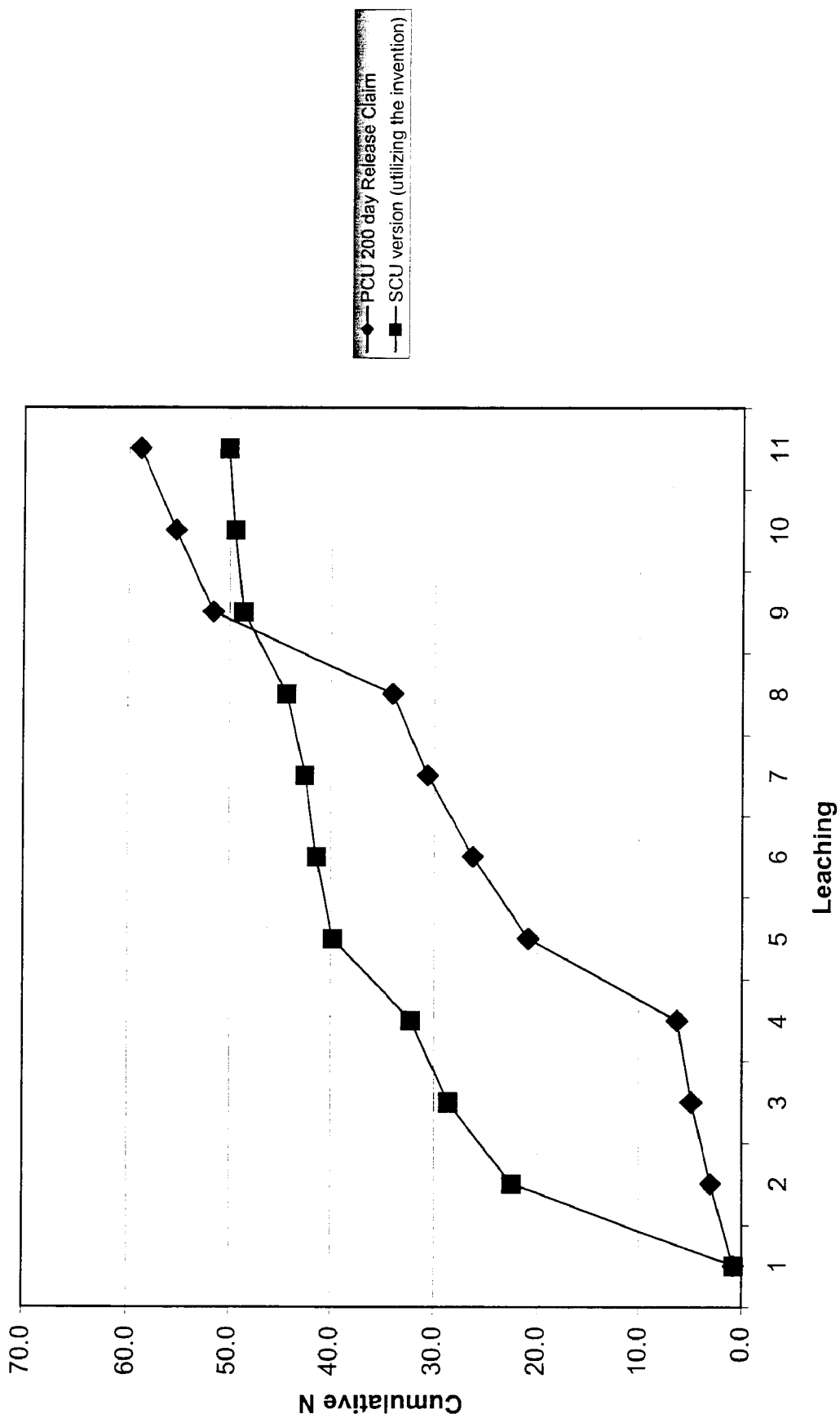

FIGURE 6: Mechanical Durability Assessment

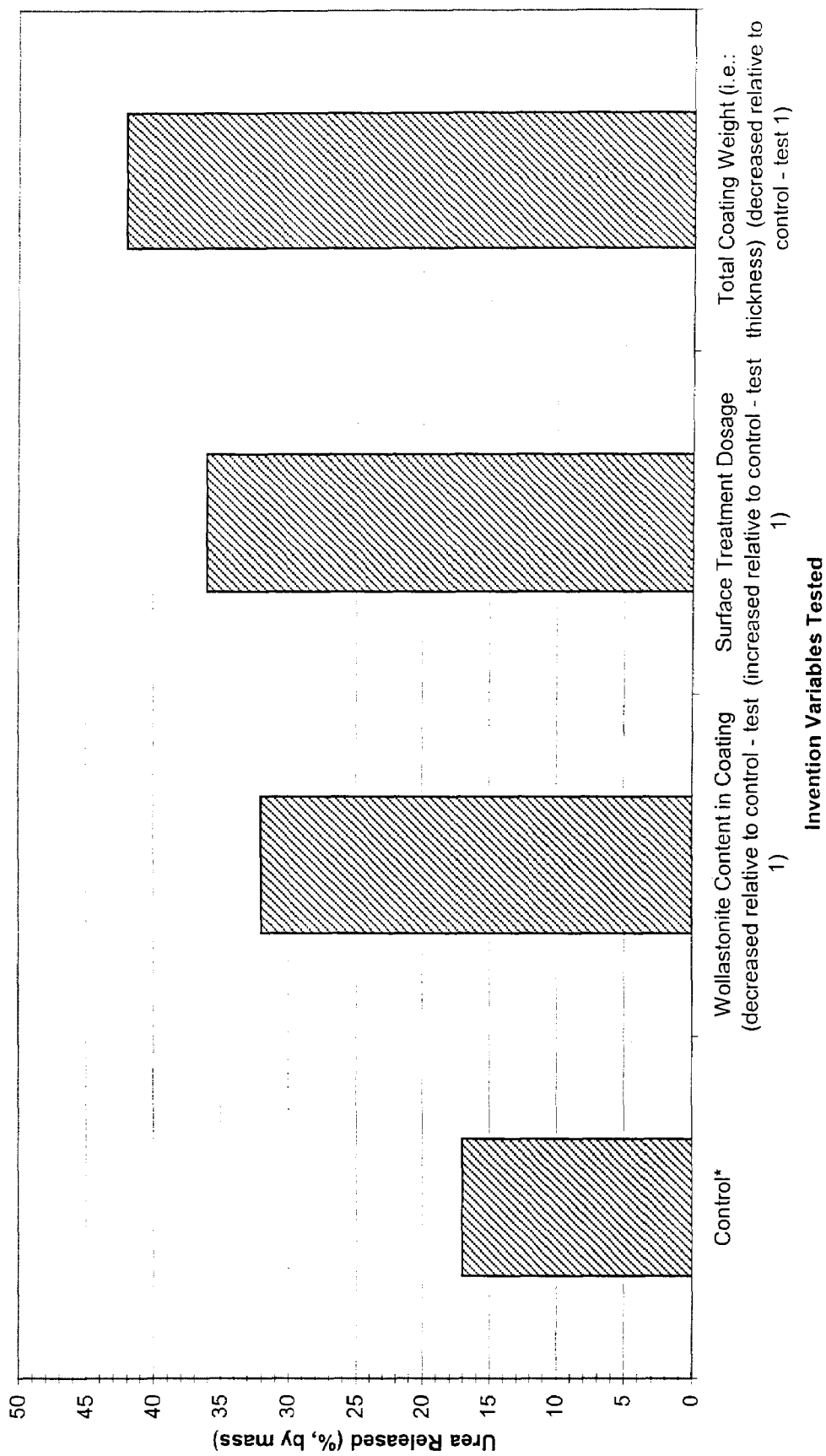

US 7,615,093 B2

CONTROLLED RELEASE PRODUCT AND METHOD FOR THE PRODUCTION THEREOF

This application is a divisional of 10/220,942, filed Dec. 12, 2002, now U.S. Pat. No. 7,189,275, which is a 371 of PCT/CA01/00301 filed Mar. 8, 2001.

FIELD OF INVENTION

The present invention relates to a permeable composition and a method for the production thereof. The permeable composition may be comprised of a substrate material. Alternately, the permeable composition may be for use in coating a substrate material. Further, the present invention relates to a controlled release product comprised of the permeable composition and a method for the production thereof.

BACKGROUND OF INVENTION

Release control is desirable in numerous applications and in various fields. For instance, release control is often utilized or sought after in applications relating to fertilizers, pesticides and pharmaceuticals. In general terms, "release" is used to refer to the exposure of an originally contained agent, substrate or matter, referred to herein as the "substrate material," to the surrounding environment. The release of the substrate material is facilitated by a releasing medium (such as a solvent) and a releasing process (such as dissolution or biodegradation).

Further, "control" refers to the ability to affect the release of the substrate material. The definition of control includes the manipulation of various release variables, including, but not limited to, the amount of substrate material released and the release rate. Extension of the release control concept to an appropriate application implies that variable release profiles can be attained through adjustment of the release control technique. "Release profile" refers to the correlation between the amount of substrate material released and time.

In addition to permitting variability with respect to the release profile, it is also desirable that the release control technique be both reliable and cost effective. Reliable release control refers to a technique that is not unduly or significantly influenced by environmental conditions (such as temperature, abrasive handling, etc.), thereby inducing an unpredictable release of the substrate material.

Generally, the release control techniques conventionally utilized and employed in various applications have not been found to be fully satisfactory. For instance, these release control techniques are often not conducive to variable or adjustable release control or such variability is limited. Further, these techniques may not be reliable, therefore limiting the ability to attain a predictable release. Finally, these techniques may not be cost effective, thereby inhibiting their widespread usage.

As indicated, release control techniques are applicable to numerous applications and fields. Agriculture represents one such application in which release control has become increasingly important. More particularly, in recent decades, food producers have instituted more efficient farming techniques designed to better utilize agricultural resources. As higher demands are placed on agricultural production, growers have increasingly focused upon improving crop yields. Consequently, by way of example, fertilizers capable of providing crops with critical nutrients have become an integral tool in attempts to optimize crop yields.

Basic fertilizers are comprised of rapidly degradable chemical compounds that are released, almost immediately, as nutrient forms suitable for plant uptake. This conversion is generally performed by simple dissolution or natural soil degradation processes. The unabated nutrient release characteristic of these basic rapid release fertilizers tends to have several disadvantages. First, fertilizer costs are typically increased due to the inefficient nutrient supply. Generally, the initial rate of nutrient release from basic fertilizers is much higher than the rate of plant uptake. Consequently, a significant amount of fertilizer nutrients are susceptible to losses (i.e.: wasted) such as soil immobilization, leaching by rainfall, or volatilization into the atmosphere.

Second, basic fertilizers have difficulty achieving optimum plant nutrition. In order to compensate for a lack of release control and nutrient losses from basic rapid release fertilizers, growers tend to rely on high application rates or multiple applications in an attempt to meet crop nutritional requirements. Growers must also adjust fertilizer application rates to account for variable soil conditions or crop demand. Using such practices, it is difficult to ensure crops are neither deficiently nor excessively fertilized. Without optimum plant nutrition, crop yields cannot be maximized.

Third, the resulting need for multiple fertilizer applications tends to increase labor and equipment maintenance costs and operating time. Fourth, besides being unavailable for future stages of plant growth, lost nutrient chemicals can pose a potential environmental hazard. Once present in surface or subsurface drinking water supplies, leached plant nutrients may become contaminants. In the case of nitrogen based fertilizers, volatilization contributes to the amount of NO and $NO_x$ emissions in the atmosphere. Fifth, excess released nutrients not consumed by environmental losses may actually be toxic to plants, particularly seedlings sensitive to soil chemistry. Such plant damage is generally referred to as crop "burning."

Therefore, there is a need in agriculture for controlled release fertilizer products and permeable fertilizer compositions capable of addressing the disadvantages of basic fertilizers which tend to have no release control. Specifically, there is a need for fertilizer products and compositions able to provide improved crop nutrition achieved through variable, controlled nutrient supplies capable of meeting disparate crop demands. Ideally, the fertilizer product or composition provides the correct amount of nutrients at the correct rate over all or a portion of the growing season. Further, there is a need to reduce fertilizer costs associated with fertilizer losses and multiple applications. Finally, there is a need to reduce environmental damage attributable to fertilizer nutrient losses and crop damage attributable to excessive fertilizer chemical concentrations in the soil.

Various attempts have been made to address the deficiencies of basic fertilizers. Specifically, the fertilizer industry has created numerous modified fertilizer products and compositions, which can be classified under the broad categories of "stabilized fertilizers" and "controlled release fertilizers." The term stabilized fertilizer is used to refer to a fertilizer amended with a chemical inhibitor designed to slow or suppress the natural soil processes responsible for converting the fertilizer into plant usable nutrients ("Controlled-Release and Stabilized Fertilizers in Agriculture," Dr. Martin Trenkel, International Fertilizer Industry Association, December 1997, p. 12).

Controlled release fertilizers are generally described as either uncoated or slowly degradable fertilizers or coated or encapsulated fertilizers. Generally speaking, uncoated or slowly degradable fertilizers tend to be chemically modified and rendered more resistant to the natural soil degradation mechanisms. For coated or encapsulated fertilizers, a permeable or porous coating composition is typically added to the surface of solid fertilizer granules in order to slow water infiltration into the soluble nutrient core. Many of the currently commercially available controlled release fertilizers release nutrients in a gradual fashion. That is, they possess release profiles with a slower release rate than basic rapid release fertilizers. However, these fertilizers typically do not utilize any appreciable release control technique. Therefore, release profile variations are difficult or impossible to attain.

Fertilizers possessing controlled release properties without the use of a governing coating are typically classified into three general categories. First, "low or limited solubility fertilizers" include conventional soluble fertilizers that have been chemically modified to produce a new fertilizer compound of reduced solubility. Second, "matrix fertilizers" are comprised of granules including nutrient compounds dispersed throughout a binder or carrier material of typically low nutrient value. Although matrix fertilizers are common, they tend to be of relatively low commercial value. This is largely attributable to the fact that, generally, a substantial quantity of low nutrient value binder is required to form the granule. Consequently, the finished product tends to have a low nutrient quantity per unit weight of fertilizer. Third, "supergranules" are slow release fertilizers provided in the form of large briquettes or sticks and rely upon a low surface area/volume ratio to delay the complete dissolution of the fertilizer. Supergranules provide no appreciable control over nutrient release profiles and are generally used in insignificant quantities.

Urea-formaldehyde is the primary "low or limited solubility fertilizer" in use today. The formation of urea-formaldehyde is achieved by reacting urea with formaldehyde under controlled conditions (temperature, time, pH, etc.) to form methylene urea polymers of various chain lengths. The initial nitrogen release from urea-formaldehyde products is associated with the dissolution of unreacted urea (usually less than 15% of the fertilizer nitrogen content). Before the remainder of the urea in the fertilizer can be released, soil microbes must first break down the polymers, thereby making additional urea available for dissolution. The longer the polymers, the longer the degradation time required to free the urea from the polymer chains. Therefore, some attenuation of the nitrogen release profile can be achieved through varying the degree of polymerization of the methylene ureas. Urea-formaldehyde products are available in granule and liquid forms.

However, there are several important disadvantages associated with the use of urea-formaldehyde products. First, urea-formaldehyde products tend to be approximately three to five times as expensive as urea. Second, urea-formaldehyde contains about 38% nitrogen. However, some of the nitrogen contained in very long polymers may be released after the growing season, or not at all. Finally, formaldehyde is a toxic material. Health concerns associated with the handling of formaldehyde in production processes and the usage of products made from formaldehyde, have been raised.

Two additional low or limited solubility urea-based fertilizers are also known. The first is isobutylidene diurea (IBDU®—32% nitrogen). IBDU® is formed via a reaction with urea and isobutyraldehyde, resulting in the formation of a single oligomer (very short chain polymer). The release rate of IBDU® is largely influenced by its particle size, where a smaller granule corresponds to a faster release rate. The second is crotonylidene diurea (CDU®—32.5% nitrogen). CDU® is a low solubility urea compound formed by a reaction of urea and acetic aldehyde. As with IBDU®, the nitrogen release rate of CDU® is determined largely by particle size.

Commercially available "matrix fertilizers" typically employ the use of degradable polymer matrices to carry nutrients such as nitrate, phosphate and potassium compounds. The matrix approach is seldom used for highly concentrated fertilizers, such as urea, because the carrier material may comprise as much as 40%, by weight of the total fertilizer. Generally, only low-grade fertilizers, such as NPK 10-10-10 (nitrogen—10%, phosphorous—10%, potassium—10%), are produced using the matrix approach.

Generally speaking, the various materials typically indicated to be suitable for fertilizer matrices are low solubility, insoluble or degradable substances, such as elemental sulphur, manure, apatite (calcium phosphate crystals), rock fines (and other minerals) and thermoplastic resins and cellulose. These low nutrient value matrix materials can comprise 10-90%, by weight of the "fertilizer." However, the majority of these matrix fertilizers are of relatively low-value. In addition, the matrix fertilizers may provide slower release than a low solubility fertilizer but they do not typically have the capacity to maintain a significant release of nutrients over extended periods of time. The slow release properties of matrix fertilizers result from the fact that the matrix must be dissolved/degraded or water must migrate through the matrix to release the nutrients contained. As such, the matrix approach to slow release fertilizers provides limited control of the nutrient release rate.

U.S. Pat. No. 4,589,903 (Sato et. al.) describes a process involving dissolving synthetic wollastonite in concentrated sulphuric acid and blending the solution with various types of manure. The mixture is granulated and allowed to ferment. The low quality pellets can then be applied as fertilizers containing relatively low quantities of nutrients and a large number of beneficial microorganisms. The wollastonite and manure form the matrix of the granules.

U.S. Pat. No. 5,653,782 (Stern et. al.) describes a process by which fertilizer particles are preheated to a temperature in excess of the melting point of sulphur, prior to being mixed with solid sulphur prills. The superheated fertilizer melts the sulphur, and as the mixture is agitated in a pugmill, the fertilizer is "coated." Although the term coating is used extensively throughout the patent, it only refers to coating the particles prior to agglomeration. The resulting fertilizer is comprised of fertilizer particles contained in a sulphur matrix. Accordingly, this process is only suitable for coating those fertilizers capable of withstanding temperatures in excess of the melting point of sulphur (120° C.) in a range of 130-280° C. Many fertilizers would melt or volatilize under such conditions. Urea, for example, melts at 132° C.

Further, the matrix fertilizer may contain a fibrous medium able to absorb water into the granule core thereby dissolving and releasing nutrients (or a herbicide) carried by the fibres. The fibrous material may be an organic medium (cellulose). U.S. Pat. No. 5,471,786 (Clausen) describes the use of a fibrous medium containing a mineral. The mineralized organic material is lignite, consisting of peat (organic) and carbonaceous mineral (coal). The hydrophilic properties of the lignite make the product a suitable plant growing medium. The "planting blocks" are capable of retaining moisture even in conditions of dry soil and low water table.

Finally, absorptive cellulose fibers may be impregnated with plant nutrients and the resulting fibers subsequently bound in a matrix. Once placed in the soil, the moisture and nutrients stored in the fibers may be released. Some of these products may possess degradable coatings in order to prevent premature leaching, but they are not designed to regulate the release of nutrients. As such, these products may have some slow release properties but without the ability to significantly adjust the release profile. The "fertilizers" produced also contain low quantities of nutrients per unit weight, due to the presence of large quantities of carrier fibers and binders.

In contrast, coated or encapsulated fertilizers involve the application of a coating to a substrate material typically comprised of a solid, granular fertilizer. In practice, encapsulated fertilizers tend to be classified according to the composition of the coating. The most commonly used coating compositions are sulphur, synthetic polymers and a combination of sulphur and synthetic polymers.

Current commercially available sulphur coated fertilizer ("SCF") generally consists of a water soluble or degradable fertilizer encapsulated by a sulphur coating, a sealant coating and typically a conditioner. Although the nutrient release from SCF tends to be slower than the release from basic fertilizers, the initial rate of nutrient release is often still considered to be too rapid. Therefore, it is desirable to obtain better control over the release profile of SCF.

The release mechanism for SCF is typically water infiltration through pores and cracks in the sulphur coating. There tend to be two sources of the imperfections encountered in sulphur coatings. First, properties inherent in molten sulphur introduce defects within the sulphur coating. The fertilizer coating process basically involves spraying a granular substrate material with an atomized spray of coating material. As the fine coating droplets strike the substrate particles, they spread-out and freeze over the granule surface. A description of a typical coating process is provided in U.S. Pat. No. 3,991,225 (Blouin). The relatively high surface tension and viscosity of molten sulphur may result in less than ideal granule wetting and coverage, thereby inducing a portion of the coating imperfections.

Second, the formation of additional coating imperfections is attributable to the allotropic nature of sulphur crystals. At various points during the freezing of molten sulphur and the aging of solid sulphur, a variety of atomic structures may be present. These sulphur structures include polymeric, amorphous, monoclinic crystalline and orthorhombic crystalline sulphur. As differential, physical variations in the structure of sulphur occur, imperfections (voids and fissures) of various sizes are formed between the sulphur crystals. Additional cracks and voids are formed as the sulphur crystals are subjected to thermal changes, resulting in differential expansion and contraction between the crystals. Although the amount and formation rate of the defects within sulphur can be influenced by the thermal history of the material, the formation of crystalline sulphur and therefore imperfections, tends to be inevitable.

Increasing the sulphur coating thickness does not provide effective control of nutrient release as imperfections form regardless of coating thickness. In the case of commercially produced SCF, an increase in coating weight does have the effect of decreasing the overall nutrient release. However, the reduced release is simply a result of more fertilizer granules receiving a heavier, layered coating which does not allow any nutrient release within the growing season (termed "lock-off"). Products containing a significant number of "locked-off" granules are inefficient as more fertilizer must be applied to achieve the total desired nutrient quantity.

Therefore, in the case of conventional SCF, control over the coating process may minimize the number of major coating defects, but there is no effective method of accurately controlling the formation of crystal imperfections. Due to a lack of imperfection control, the permeability of the sulphur coat cannot be significantly varied. Consequently, sufficient attenuation of the nutrient release profile is not possible with conventional sulphur coating technologies.

In an attempt to reduce the initial rate of nutrient release, a sealant may be added to the surface of the sulphur coating. The sealant fills the coating imperfections that would otherwise transmit water into the fertilizer granule core relatively quickly. The sealants selected are typically hydrophobic waxes, oils, polyethylene resins or combinations thereof. These temporary sealants are subject to being degraded by soil microbes prior to water penetration through the sulphur coat and into the fertilizer core. Thus, a microbiocide is often applied to the sealant in order to prevent premature degradation of the sealant. As such, sealants act to only delay water contact with the sulphur coating. In addition, sealants often only partially survive typical fertilizer handling operations, resulting in a discontinuous encapsulation of the sulphur coating.

In addition, in order to obtain a relatively free-flowing product that may be easily handled, conditioners may also be added to SCF. Conditioners are typically minerals such as finely divided clay or diatomaceous earth, which counteract the "stickiness" of the sealant.

SCF may also be undesirable due to the fact sulphur is a brittle material. Even well formed coatings are prone to cracking and chipping during fertilizer handling operations. In the event the sulphur coating remains intact after handling, the micro-pores and fissures within the coating are generally enlarged, resulting in further degradation of any release control properties.

The insufficient ability to control the release of the substrate material from SCF has resulted in release profiles which are not ideal or even desirable for many applications. This deficiency is exacerbated by the poor coating durability exhibited by conventional SCF. Thus, in summary, SCF lacks desirable performance attributes. First, significant control over a generally undesirable nutrient or substrate release profile is typically not attainable using conventional sulphur coatings. Second, typical fertilizer handling operations damage relatively fragile sulphur coatings of SCF, resulting in a release profile that tends to be undesirable, unreliable and invariable.

In the case of SCF, recent technological developments have focussed upon improving the sulphur coating durability and/or the coating process. For example, U.S. Pat. No. 4,636,242 (Timmins) describes the modification of elemental sulphur using a dialkyl polysulphide plasticizer. Timmins indicates that the admixture is capable of reducing the viscosity of molten sulphur (resulting in better granule coverage) and plasticizing the solidified coating (resulting in a more flexible coating). These developments may somewhat reduce the rapid, initial nutrient release associated with conventional SCF and improve the handling characteristics of the coated fertilizer as compared with SCF. However, no significant release control technique appears evident.

Synthetic polymer coated fertilizer ("PCF") is typically comprised of solid fertilizer particles as the substrate material surrounded by a polymer coating (i.e.: polyethylene, polyurethane, polyolefin, alkyd resin, etc.). The are several advantages of PCF as compared to SCF. First, PCF typically possesses a less rapid, initial rate of release and sustained nutrient supply longer into the growing season. Second, polymer coatings are typically more durable than sulphur coatings and therefore, less susceptible to damage during handling. Third, due to the lighter coating material, PCF usually possesses a higher nutrient content, by total weight of fertilizer. In the case of commercially available SCF, the sulphur coating may comprise up to 30% of the total fertilizer weight. By comparison, PCF seldom contains more than 15% coating material, by weight of fertilizer.

However, there are some disadvantages associated with PCF. There may be environmental concerns. Polymer coatings may breakdown very slowly (or not at all), resulting in a plastic residue in the soil system. Further, due to increased process and material costs, PCF is generally significantly more expensive than other controlled release fertilizers, including SCF.

Water infiltration through the porous or permeable polymer coat provides the release mechanism for PCF. Depending upon the technology, the porosity or permeability of the polymer coating may be fixed or variable. In the case of fixed porosity or permeability coatings, no significant control over the nutrient release profile is attainable. A degree of nutrient release attenuation can be achieved with variable permeability polymer coatings. However, due to complex manufacturing processes and expensive materials, the high cost of these products often prohibits their usage in agriculture. The largest market for PCF tends to be horticulture and "high-end" lawn fertilizers.

Commercially available synthetic polymer and sulphur coated fertilizers ("PSCF") typically include approximately 15% sulphur coating and less than 2% polymer coating. Sulphur is the primary fertilizer coating used in conjunction with the secondary polymer coating which is designed to act as an improved sealant. Polymer sealants are typically more durable than traditional sealants and they do not require the addition of a conditioner to the coated particles.

PSCF is an attempt to combine the lower initial rate of release and durability of polymer coatings with the low-cost of a sulphur coating. The release profile of most PSCF is still predominantly governed by the primary sulphur coating. The polymer topcoat is generally provided to limit degradation of the sulphur coating during handling. More expensive PSCF may incorporate a polymer coating capable of providing a degree of release control (i.e.: a variable permeability membrane).

Further, in the field of construction materials (such as sulphur concrete and the like), the addition of filler materials, including mineral fillers and fibers, to elemental sulphur has been used to create materials with highly desirable "permanent" durability. For example, U.S. Pat. No. 4,484,959 (Hinkebein) discloses an invention in which mixtures of molten sulphur and crystalline phosphate fibers are cast into various structures. The focus of Hinkebein is to provide a strong, durable material suitable for such long-term applications as tanks, pipes and pavement.

U.S. Pat. No. 4,026,719 (Simic) describes a material comprised of sulphur, sulphur plasticizer (such as dicyclopentadiene) and a reinforcing filler such as mica, talc (platy silicates) or glass fibers. The composition is described as useful for durable coatings for floors and slabs. Simic also refers to the potential use of the composition for "water impoundment" applications (such as lining irrigation ditches), thereby implying an impermeable (or very low permeability) material is produced.

In the above mentioned references and others similar in nature, fibrous materials may be used to mechanically reinforce the properties of sulphur compositions in an extreme fashion (i.e.: ultimate strengthening and durability, minimizing or eliminating permeability, etc.). Therefore, it is feasible that filler reinforcement could improve the durability of controlled release products or compositions. However, direct application of the reinforcing techniques described would likely result in an impermeable (or unacceptably low permeability) composition or controlled release product, thereby "locking off" the substrate material.

"Stabilization" is used herein to refer to methods designed to reduce the formation of defects (voids and fissures) at the material crystal level, as described above. Such defects may be formed as a result of differential crystal movement caused by allotropic crystal conversion and/or thermally induced expansion and contraction of the crystals. Stabilization techniques for materials such as sulphur may be classified as chemical stabilization or physical stabilization.

Chemically stabilized sulphur has been used in various construction materials, such as sulphur concrete. According to A. H. Vroom, "Sulphur Polymer Concrete and its Applications," VII International Congress on Polymers in Concrete, Sep. 22-25, 1992, Moscow, pp. 606-619, a polymeric sulphur concentrate (SRX) is added to molten elemental sulphur. Upon freezing, the SRX polymer is indicated to promote formation of micro sulphur crystals, as opposed to macro sulphur crystals. Apparently, as the modified sulphur experiences crystal conversion and/or thermal changes, less differential movements are experienced by the fine crystals, thereby reducing defect formation.

Dicyclopentadiene, styrene and limonene are examples of polymeric polysulphide plasticizers that, when added to molten sulphur, tend to substantially reduce the amount of crystalline sulphur formed upon freezing (i.e.: more amorphous and polymerized sulphur is present in the cooled material) (B. R. Currell et. al., "New Uses of Sulphur," Advances in Chemistry Series 140, 1975, pp. 1-17). However, these chemical admixtures generally do not provide permanent stabilizing as sulphur crystals are eventually formed over time.

Polymeric polysulphides have also been used in various sulphur based construction materials such as road markings and masonry coatings. However, in the case of sulphur coated fertilizers, such plasticizing techniques are generally not compatible with the fertilizer coating process. During fertilizer coating, molten mixtures are sprayed onto the fertilizer granule substrate material. Once added to molten sulphur, polymeric polysulphides tend to increase the viscosity and crystallization time of the molten mixture, as described in U.S. Pat. No. 4,129,453 (Simic). Therefore, during spraying, the modified polymeric sulphur tends to exhibit very poor granule wetting and may even agglomerate fertilizer granules, as the modified sulphur requires more time to freeze (R. Jerome Timmins, "Modified Sulphur Coated Urea," 198th ACS National Meeting, Miami Beach, Fla., Sep. 10-15, 1989, Paper 23, p. 3).

Alternately, fine particulate filler materials have been used to physically stabilize sulphur compositions, primarily in construction material applications. Once dispersed throughout molten sulphur, the particulate inclusions serve as centers for crystallization during freezing, thereby promoting the growth of "uniform, dense, fine-crystal structures" as described in Yu. I. Orlowsky and B. P. Ivashkevich, "Peculiarities of Technology of Production of Sulphur Polymer Concrete . . . ," VII International Congress on Polymers in Concrete, Sep. 22-25, 1992, Moscow, p. 664. The stabilized crystal structure apparently experiences less and smaller defects during differential crystal movement induced by sulphur crystal conversion and thermal expansion and contraction. Therefore, dispersed particulate filler materials in sulphur may reduce the uncontrollable release mechanism currently utilized in coating applications such as SCF (i.e.: voids and fissures).

Release mechanisms for known or conventional controlled release products and compositions may be generally classified into two categories. The first category is solvent infiltration through a conductive coating for the substrate material. The second category is solvent infiltration through a conductive matrix including the substrate material.

Regarding the first category of release mechanisms, a soluble substrate material may be encapsulated with a coating possessing pores introduced at the time of manufacturing (for example, SCF or PCF as described in "Controlled-Release and Stabilized Fertilizers in Agriculture," Dr. Martin Trenkel, International Fertilizer Industry Association, December 1997, pp. 23-26). Upon contact with the coating, the appropriate solvent can enter the core of the substrate material via the pores and dissolve the substrate material, thereby releasing it to the surrounding environment.

By employing this first release mechanism, control over the release rate may only be achieved by varying the porosity or permeability of the coating. However, many existing coating technologies lack the ability to accurately or significantly vary the coating porosity or permeability. Although polymer coatings with a degree of permeability control exist, the high cost of such coatings often prohibit their widespread application. For example, fertilizers coated with variable permeability polymers are seldom used in mass agriculture applications due to the high cost. The high cost of variable permeability PCF is typically a result of relatively expensive coating materials and relatively complex coating processes.

Regarding the second category of release mechanism, fibrous media may be impregnated with soluble substrate materials. For instance, the absorbent fibers may be agglomerated with the substrate, forming a fibrous "matrix." Appropriate solvents may then migrate throughout the fibers, releasing the soluble substrate material.

U.S. Pat. No. 5,019,564 (Lowe et al) discloses an invention whereby plant fibers are used to absorb organic pesticides prior to being loosely agglomerated into relatively non-friable "granules." Upon exposure to water, the pesticides absorbed within the fibers are released from the "granules" more slowly than pesticides introduced directly to the agricultural environment.

U.S. Pat. No. 5,762,678 (Hiles) describes the development of a soil enhancing complex in which the soft cores of cellulose fibers are digested, resulting in hollow, "micro-capillaries" composed of the cellulose wall material. The processed "micro-capillaries" may then absorb water and plant nutrients within the cellulose tubes and walls. The laden "micro-fibers" are subsequently agglomerated into pellets and coated with a moisture retaining hydrogel. A gelatinous polymer coating is then applied for the purpose of retaining the integrity of the pellet. The contained nutrients may then be gradually released into the soil environment.

U.S. Pat. No. 5,364,627 (Song) discloses a technology wherein the releasable agent is dispersed throughout the cross sections of polymer fibers. This dispersion is accomplished by mixing the agent with the molten polymer, prior to spinning the mixture into fibers. The release of the agent is accomplished via solvent migration through contiguously arranged agent particles contained within the fiber matrix. Should the releasable agent not be arranged contiguously within the fiber, mechanical action (i.e.: chewing) may be required to expose the releasable agent to solvent contact.

In order to achieve release, the "sponge" or "wick drain" matrix approaches described in the above patents, and several others, rely on solvent transmission through channels or openings contained within the fibrous media. While such techniques are conducive to gradual release, and perhaps controlled release, they are generally not suitable for applications such as high nutrient content fertilizers. One of the factors determining the value of fertilizer products is the nutrient content, by weight of fertilizer. When used in slow release fertilizer applications, the matrix approaches previously described appear to result in a low value fertilizer product due to dependence on a large quantity of non-nutrient, carrier fibers and binders.

Finally, the dispersion of fillers within the permeable composition or controlled release product is also relevant. In this regard, U.S. Pat. No. 4,129,453 (Simic) describes a construction material comprised of plasticized sulphur, reinforcing asbestos fibers and dispersing agents, such as talc or mica which aid in achieving dispersal of the asbestos. The dispersing agent is necessary to avoid "lumpiness" of the molten material mixture. Such dispersing agents are not applied directly on the filler. Rather they added to the plasticized sulphur prior to filler mixing.

SUMMARY OF INVENTION

The present invention is directed generally at permeable compositions and at methods for producing such permeable compositions. The present invention is also directed at controlled release products which include the permeable compositions of the present invention and at methods for producing such controlled release products.

The permeable compositions of the present invention include a matrix material and a particulate filler material which is dispersed throughout the matrix material. The permeability of the permeable compositions is derived at least in part from interfacial passageways between the matrix material and the external surfaces of the particles of filler material. These interfacial passageways are located at the interfaces between the matrix material and the external surfaces of the particles of filler material. Additional permeability of the permeable compositions may be derived from the matrix material if the matrix material is itself permeable or degradable or if the matrix material contains imperfections.

The controlled release products of the present invention include a substrate material which is coated with at least one layer of the permeable composition of the present invention.

The invention is based upon the discovery that the permeability of the permeable compositions can be controlled by controlling the interfaces and the interfacial passageways.

The ability to control the permeability of the permeable compositions makes the compositions of the present invention attractive for use in numerous applications. either to control permeability per se or to control the release of substrate materials which are either coated with the permeable composition or are included as a component of the permeable composition.

For example, in agricultural applications the permeable compositions of the present invention may be useful for coating or incorporating substrate materials such as seeds, fertilizers, pesticides and herbicides. Similarly, in pharmaceutical applications the permeable compositions of the present invention may be useful for coating or incorporating substrate materials such as vitamins and medicines.

Preferably the permeability of the compositions is controlled in the present invention by applying a degradable surface treatment material to the external surfaces of the particles of filler material before the filler material is dispersed throughout the matrix material. When the surface treated particles of filler material are dispersed throughout the matrix material the interfacial passageways are defined by the surface treatment material which is present on the external surfaces of the particles of filler material and the surface treatment material provides degradable interfaces between the matrix material and the external surfaces of the particles of filler material.

By selecting the relative proportions and the physical and chemical characteristics of the matrix material, the filler material and the surface treatment material, the permeability of the permeable compositions can be controlled. By controlling the thickness and the integrity of the coating layer of a permeable composition that is applied to a substrate material, the permeability of a controlled release product can be further controlled.

The term "substrate material" as used herein refers to any material, whether organic, inorganic, natural or synthetic which is intended to be delivered or released or exposed to an environment. The substrate material may, for example but without limiting the generality of the foregoing, be comprised of seeds, fertilizers, pesticides, herbicides, fungicides, medicines, vitamins, or foods.

The term "matrix material" as used herein refers to any material, whether organic, inorganic, natural or synthetic which is capable of providing a matrix for the filler material in the permeable composition. The matrix material may or may not include one or more substrate materials. Depending upon the intended application of the invention, the matrix material may be permeable or impermeable, and may be physically and chemically stable or may be degradable.

The term "particulate filler material" as used herein refers to any particulate material, whether organic, inorganic, natural or synthetic. Filler material may be of any particle shape or particle size. There is no lower or upper limit to the particle size of the filler material as long as the particle size of the filler material is compatible with the intended application of the invention. The particles of filler material may also have any shape (i.e., aspect ratio and surface area per unit volume) as long as the particle shape of the filler material is compatible with the intended application of the invention. Although a fibrous (i.e., high aspect ratio) filler material may be preferred for some applications of the invention, low aspect ratio filler materials may also be used in the invention and may be preferred for some applications.

The term "degradable surface treatment material" as used herein refers to any material, whether organic, inorganic, natural or synthetic, which may be effectively applied to the external surfaces of particles of filler material, which will provide degradable interfaces between the matrix material and the external surfaces of the particles of filler material, and which will subsequently degrade either entirely or in part through processes such as dissolution, thermal decomposition, biological degradation or chemical decomposition. The surface treatment material may be in solid or liquid form.

The term "interfacial passageways" as used herein refers to gaps, spaces or pores which are formed at the interfaces between the matrix material and the external surfaces of the particles of filler material. These interfacial passageways provide pathways for the migration of substances throughout the permeable composition. An interfacial passageway may be defined by a single particle of filler material or may be defined by a plurality of particles of filler material which are contiguous or are interconnected by gaps, spaces or pores. Two or more interfacial passageways may also be interconnected to form a network of interfacial passageways in the matrix.

The term "degradable interfaces" as used herein refers to interfaces that are formed when surface treated particles of filler material are dispersed throughout the matrix material, (i.e., interfaces between the matrix material and the surface treatment material and interfaces between the surface treatment material and the external surfaces of the particles of filler material). In the permeable compositions of the present invention, the interfacial passageways are initially either fully or partially filled with degradable surface treatment material in order to provide the degradable interfaces. These degradable interfaces are fully or partially degradable upon degradation of the surface treatment material to facilitate some migration of substances through the interfacial passageways. Prior to degradation, the degradable interfaces may facilitate the transfer of forces between the matrix material and the filler material, thus enabling the filler material to perform a mechanical reinforcement function in the permeable composition.

The term "permeable composition" as used herein refers to a composition which is comprised of a matrix material, a particulate filler material, and at least some interfacial passageways between the matrix material and the external surfaces of the particles of filler material. The matrix material may or may not include a substrate material.

The term "controlled release product" as used herein refers to a product which is comprised of a substrate material and a coating on the substrate material which includes at least one layer of a permeable composition. The term "release" as used herein refers to the exposure of the substrate material to a surrounding environment. The term "control" refers to the ability to affect the release of the substrate material from the controlled release product.

The term "stable" as used herein refers to a material which does not tend to be prone to physical or chemical degradation through processes such as dissolution, thermal decomposition, biological degradation or chemical decomposition.

In a first preferred aspect, the invention is a permeable composition comprising:
  (a) an amount of a matrix material;
  (b) an amount of a particulate filler material dispersed throughout the matrix material, wherein each of the particles of filler material is comprised of an external surface; and
  (c) interfacial passageways between the matrix material and the external surfaces of the particles of filler material.

In a second preferred aspect, the invention is a controlled release product comprising:
  (a) a substrate material;
  (b) a permeable composition coating the substrate material in a coating layer, the permeable composition comprising:
    (i) an amount of a matrix material;
    (ii) an amount of a particulate filler material dispersed throughout the matrix material, wherein each of the particles of filler material is comprised of an external surface; and
    (iii) interfacial passageways between the matrix material and the external surfaces of the particles of filler material.

In a third preferred aspect, the invention is a method for producing a permeable composition, the method comprising the steps of:
  (a) providing an amount of a particulate filler material, wherein each of the particles of filler material is comprised of an external surface;
  (b) applying an amount of a degradable surface treatment material to the external surfaces of the particles of filler material to form surface treated particles of filler material; and
  (c) dispersing the surface treated particles of filler material throughout an amount of a matrix material to form the permeable composition such that interfacial passageways between the matrix material and the external surfaces of the particles of filler material are defined by the surface treatment material and such that degradable interfaces between the matrix material and the external surfaces of the particles of filler material are provided by the surface treatment material.

In a fourth preferred aspect, the invention is a method for producing a controlled release product, the method comprising the steps of:

(a) providing an amount of a particulate filler material, wherein each of the particles of filler material is comprised of an external surface;

(b) applying an amount of a degradable surface treatment material to the external surfaces of the particles of filler material to form surface treated particles of filler material; and (c) dispersing the surface treated particles of filler material throughout an amount of a matrix material to form a permeable composition such that interfacial passageways between the matrix material and the external surfaces of the particles of filler material are defined by the surface treatment material and such that degradable interfaces between the matrix material and the external surfaces of the particles of filler material are provided by the surface treatment material;

(d) providing a substrate material; and (e) applying the permeable composition to the substrate material in a coating layer to form the controlled release product.

The substrate material may be incorporated into the permeable composition as a component of the matrix material or the substrate material may be coated with the permeable composition. A permeable composition comprising a substrate material may also be coated with a permeable composition which does not comprise a substrate material.

The substrate material may be selected from a wide range of materials depending upon the application of the invention. In the preferred embodiment, however, the substrate material is comprised of a fertilizer. The fertilizer may be incorporated into the permeable composition to form a "matrix type fertilizer" or particles of the fertilizer may be coated with the permeable composition to form a "coated type fertilizer". A matrix type fertilizer may also be coated with a permeable composition to form a combination fertilizer if desired. Preferably the fertilizer is a urea fertilizer.

The primary functions of the matrix material are to provide a matrix for the filler material and to provide support for the interfacial passageways. The matrix material may also increase the durability of a permeable composition or controlled release product or serve as a carrier for a substrate material which has been incorporated into a permeable composition or controlled release product.

The matrix material may be comprised of any organic or inorganic material which is suitable for the intended application of the permeable composition or controlled release product. Depending upon the intended application, the matrix material may be permeable or impermeable and may either be chemically and physically stable or be degradable.

In the preferred embodiment the substrate material is comprised of a fertilizer. In one preferred embodiment of permeable composition, the matrix material is preferably comprised of sulphur. In a second preferred embodiment of permeable composition, the matrix material is preferably comprised of fertilizer as a substrate material and sulphur as a carrier material. The sulphur is most preferably elemental sulphur.

In the preferred embodiment, sulphur is preferred because it is inexpensive relative to other possible matrix materials. Elemental sulphur is particularly preferred because it is inexpensive relative to chemically stabilized sulphur materials. Although elemental sulphur tends to be chemically unstable and prone to deterioration due to abrasion and other physical stresses, these tendencies are minimized by the presence of the filler material in the matrix, which serves in the preferred embodiment to mechanically reinforce and physically stabilize the elemental sulphur matrix material.

The primary function of the filler material is to act with the surface treatment material and the matrix material to form the interfacial passageways. The filler material may also provide mechanical reinforcement for the matrix material or physical stabilization of the matrix material.

The filler material may be comprised of any particulate organic or inorganic material which is compatible with the matrix material and which may be surface treated with the surface treatment material. Preferably the filler material is relatively stable and relatively impermeable.

In the preferred embodiment where the substrate material is comprised of a fertilizer, the filler material is preferably comprised of wollastonite. Most preferably, the filler material in the preferred embodiment is comprised of wollastonite fibers.

The primary function of the surface treatment material is to define the interfacial passageways when the filler material is dispersed throughout the matrix material by forming degradable interfaces between the matrix material and the external surfaces of the particles of filler material.

A possible secondary function of the surface treatment material may be to facilitate at least a temporary bond between the matrix material and the filler material which may enable the filler material to perform a mechanical reinforcement function in the permeable composition. This bond will tend to deteriorate upon degradation of the degradable interfaces.

The surface treatment material may also aid in dispersing the filler material throughout the matrix material. Alternatively, if desired or necessary, a second surface treatment agent may be utilized for the purpose of aiding in the dispersal of the filler material.

The surface treatment material may be comprised of any substance which is compatible with the intended application of the invention and which is capable of providing the degradable interfaces due to dissolution, thermal decomposition, biological degradation, chemical decomposition or some other process. Preferably the surface treatment material will also provide a bond between the matrix material and the filler material which will deteriorate upon degradation of the degradable interfaces.

In the preferred embodiment where the substrate material is comprised of a fertilizer, where the matrix material is comprised of sulphur, and where the filler material is comprised of wollastonite, the surface treatment material is preferably comprised of a naphthalene sulphonate formaldehyde copolymer.

The durability, permeability and other properties of the permeable composition will depend upon the following controllable design factors:

1. the choice of matrix material, filler material, and surface treatment material;
2. the chemical and physical characteristics of the matrix material;
3. the chemical and physical characteristics of the filler material (including particle shape and particle size);
4. the chemical and physical characteristics of the surface treatment material; and 5. the relative proportions of matrix material, filler material and surface treatment material in the permeable composition.

The durability, permeability and other properties of the controlled release product will depend upon further controllable design factors relating to the thickness and the integrity of the coating of permeable composition which is applied to the substrate material.

These design factors make it possible to tailor a permeable composition and controlled release product to provide a specific desired performance. This desired performance may relate to the permeability of a permeable composition or to the release profile for a substrate material which is included in a permeable composition or in a controlled release product.

The matrix material is selected to be compatible with the filler material, the surface treatment material and with the intended application of the invention. A relatively durable and stable matrix material may provide a more extended release profile for a substrate material. A degradable matrix material may provide a shortened release profile for a substrate material. Elemental sulphur, the preferred matrix material in the preferred embodiment for fertilizer applications, tends to disintegrate under physical stress or in the presence of water or humidity, thus releasing the fertilizer into the surrounding environment more quickly than if the matrix material were more physically stable. The matrix material is preferably compatible with the environment in which the permeable composition is to be used and is preferably cost effective.

The filler material is selected to be compatible with the matrix material, the surface treatment material and with the intended application of the invention. A relatively stable filler material will likely be able to perform a physical reinforcement function for the matrix over the entire expected service life of the permeable composition. A degradable filler material may not provide good physical reinforcement performance, but may provide a shortened release profile for a substrate material as the filler material degrades. The filler material is preferably compatible with the environment in which the permeable composition is to be used and is preferably cost effective.

The surface treatment material is selected to be compatible with the matrix material, the filler material and with the intended application of the invention. The surface treatment material is preferably compatible with the environment in which the permeable composition is to be used and is preferably cost effective. Preferably the surface treatment material enhances or at least does not interfere with the dispersal of the filler material throughout the matrix material.

The particle size and shape of the filler material is selected to be compatible with the intended application of the invention and with the functions to be performed by the filler material. High aspect ratio filler materials will tend to provide more physical reinforcement for the matrix material than low aspect ratio filler materials. On the other hand, high aspect ratio filler materials will have a higher surface area per unit volume than low aspect ratio filler materials and may therefore be more difficult to disperse in the matrix material.

The following general trends can be suggested for design factors pertaining to permeable compositions and controlled release products:

1. the amount of mechanical reinforcement (or physical stabilization) provided to a matrix by a filler material will increase as the amount of filler material increases;
2. the amount of mechanical reinforcement provided to a matrix by a filler material will generally increase as the aspect ratio of the filler material increases;
3. the amount of mechanical reinforcement provided to a matrix by a filler material will generally increase as the stability of the filler material increases;
4. the dispersability of a filler material throughout a matrix material may tend to decrease as the aspect ratio of the filler material increases (due to an increase in surface area per unit volume of filler material);
5. the permeability of a permeable composition may tend to decrease and the release profile for a controlled release product may tend to extend as the amount of mechanical reinforcement or physical stabilization of a matrix material increases (due to a potential increase in durability, stability or integrity of the permeable composition);
6. the permeability of a permeable composition may tend to increase and the release profile for a controlled release product may tend to shorten as the number of interfacial passageways in the permeable composition increases (due to an increase in the number of potential flow pathways in the permeable composition);
7. the permeability of a permeable composition may tend to increase and the release profile for a controlled release product may tend to shorten as the amount of surface treatment material applied to a filler material increases (due to a potential increase in the size of the interfacial passageways);
8. the permeability of a permeable composition may tend to decrease and the release profile for a controlled release product may tend to extend as the stability of a matrix material increases (due to a potential increase in the durability, stability or integrity of the permeable composition);
9. the permeability of a permeable composition may tend to decrease and the release profile for a controlled release product may tend to extend as the stability of a surface treatment material increases (due to a potential increase in the amount of time required to degrade the degradable interfaces);
10. the release profile for a controlled release product may tend to extend as the thickness of a coating layer increases (due to increased length of the interfacial passageways); and
11. the release profile for a controlled release product may tend to extend as the integrity of a coating layer increases (due to reduced permeability of the permeable composition).

This list of trends is not exhaustive. It must also be cautioned that some of the trends may be subject to interdependence of design factors. For example, although increasing the amount of filler material in a matrix may reduce permeability by increasing the durability, stability and integrity of a permeable composition, an increase in amount of filler material also offers the potential for increased permeability due to an increased number of interfacial passageways. The net effect of an increase in the amount of filler material may therefore be dependent upon properties such as the initial stability and durability of the matrix material.

With this caution in mind, the design factors can be manipulated in the application of the invention to provide an overall net effect which will assist in the design of a permeable composition or controlled release product having desired properties.

In addition, each of the design factors may be varied within a particular permeable composition or controlled release product to refine further the properties of the composition or product. As one example, a single permeable composition may include more than one type of filler material or particles of filler material having varying shapes and sizes. As a second example, a single permeable composition may contain particles of filler material having varying types or amounts of surface treatment material applied to them.

SUMMARY OF DRAWINGS

Embodiments of the invention will now be described with reference to the accompanying drawings, in which:

FIG. 1 provides a graph of durability test results for Example 1 performed for various surface coatings;

FIG. 2 provides a graph of the release control test results for Example 1 for the Wollastonite sugar treatment series performed for surface treated wollastonite;

FIG. 3 provides a graph of the release control test results for Example 1 for the Wollastonite sulphonate treatment series performed for surface treated wollastonite;

FIG. 4 provides a graph of the release control test results for Example 1 for the muscovite mica aluminum sulphate treatment series performed for surface treated mica;

FIG. 5 provides a graph of the results of a controlled release assessment study for Example 2;

FIG. 6 provides a graph of the results of a mechanical durability assessment study for Example 2; and FIG. 7 provides a graph of the results of a variation of controlled release properties for Example 3.

DETAILED DESCRIPTION

The present invention relates to a variety of applications and fields requiring or desiring a mechanism for achieving a relatively reliable and relatively controlled release of a substrate material either contained within a permeable composition or having a coating applied thereto. Via attenuation of the release mechanism, the present invention may provide variable rates of release. Specifically, the release control technique of the present invention is believed to be amenable to producing permeable compositions and controlled release products possessing a variety of release profiles designed to meet specific product requirements. For example, with respect to agricultural applications, the controlled release fertilizer products and permeable fertilizer compositions of the present invention may allow the tailoring of nutrient (substrate material) release profiles to disparate crop nutritional requirements, soil conditions and/or growing season length.

Further, the present invention may provide improved durability to the permeable compositions and controlled release products to reduce potential physical degradation under applied stresses (such as, abrasive handling operations, thermal stresses, etc.). Thus, such damage, which would normally unduly influence the release profile, may be mitigated. In addition, as a result of improved durability, the amount of the permeable composition or the release control product required to withstand applied stresses may be reduced. Thus, the resulting composition or product may possess higher concentrations of valuable substrate material and lower concentrations of lesser valued materials.

As a result of the above, the present invention may provide a relatively cost effective manner of introducing release profile variability to those applications currently lacking such an attribute (such as sulphur coated fertilizers). The present invention may also provide a less expensive release control alternative to those products currently employing costly release control techniques (such as variable permeability polymer membrane coatings).

As described further below, the preferred embodiment of the within invention is particularly applicable to agricultural applications, such as fertilizers and pesticides. However, the permeable compositions, release control products and methods described herein are further applicable to other applications and fields such as pharmaceuticals, medicines and nutraceuticals.

With respect to agricultural applications, and in particular fertilizers, the present invention may provide growers with several advantages. Utilizing variable release profiles, growers can conceivably select compositions and products designed to meet their specific crop and soil demands. Improved substrate material (fertilizer or nutrient) delivery may be attainable with reduced numbers of applications. Further, the initial rate of substrate material release may be reduced, thereby minimizing soil toxicity and crop "burning" associated with uncontrolled release fertilizers and some controlled release fertilizers (such as conventional SCF). By reducing the initial rate of substrate material release, fewer losses may be incurred. A reduction in the required number of applications throughout the growing season may represent a substantial savings on labour and equipment operating and maintenance costs. As well, fewer losses may result in decreased potential for water contamination or harmful volatilization emissions.

The present invention is directed at a relatively durable, cost effective method of obtaining controlled release for those applications requiring such an attribute. In particular, the within invention is directed at a permeable composition comprising an amount of a matrix material, an amount of a particulate filler material dispersed throughout the matrix material, wherein each of the particles of filler material is comprised of an external surface, and interfacial passageways between the matrix material and the external surfaces of the filler material.

In a first aspect of the invention, the matrix material of the permeable composition is comprised of a substrate material such that the filler material is dispersed throughout the substrate material. In a second aspect of the invention, the permeable composition is used in coating a substrate material. In a third aspect of the invention, the invention is directed at a controlled release product comprised of a substrate material and a permeable composition coating the substrate material in a coating layer. Finally, the present invention is further directed at a method for producing the permeable composition and a method for producing the controlled release product.

In all aspects of the invention, a degradable surface treatment material is preferably applied to the external surfaces of the particles of filler material such that the interfacial passageways are defined by the surface treatment material and such that the surface treatment material provides degradable interfaces between the matrix material and the external surfaces of the particles of filler material.

Generally, the release control mechanism of the present invention is related to the selection and interplay of a number of factors: the filler material properties (including particle size, aspect ratio and surface area); filler material quantity or amount; surface treatment material properties; surface treatment material quantity or amount; and the thickness of the permeable composition. Further, the properties of the filler material and the quantity of filler material also affect the potential mechanical reinforcing and physical stabilizing abilities of the within invention. Finally, a number of other factors are also considered in the selection of the filler material and surface treatment material of the invention: the dispersion capabilities of the filler material; the compatibility of the filler material and surface treatment material with the method of production of the permeable composition and controlled release product; the environmental acceptance of the filler material and surface treatment material; and the costs of the filler material and surface treatment material. All of these factors and considerations are discussed in detail below.

The substrate material of the present invention may be any substrate, agent or matter desired or required to be released to the surrounding environment in a relatively controlled manner. For instance, the substrate material may be, but is not limited to, one or more of the following: seeds; fertilizers (such as urea, ammonium phosphate, etc.); herbicides; fungicides; pesticides; pharmaceuticals; vitamins; veterinary medicines; and foods. In the preferred embodiment of the invention, the substrate material is comprised of a fertilizer. Any fertilizer suitable for the particular application may be used. However, in the preferred embodiment, the fertilizer is comprised of Urea ($(NH_2)_2CO$). Urea has the highest content of nitrogen commonly commercially available for granular fertilizers (46%, by weight).

The filler material of the present invention may be any particulate material compatible with the particular application of the invention. Preferably the filler material possesses an aspect ratio in which the size of the filler particle is greater in one dimension than in another dimension. In other words, the filler material preferably has an aspect ratio greater than 1. Examples of fillers possessing an aspect ratio greater than one include fillers which are comprised of plate structures, fillers which are comprised of fiber structures and combinations thereof. Preferably, the filler material is comprised of a fiber structure. However, as indicated, a combination of different filler materials may also be used. In the discussion that follows, "fibrous filler" shall describe any filler material possessing an aspect ratio greater than one (such as fibers and plates) while "non-fibrous filler" shall describe any filler material not possessing an aspect ratio greater than one.

It is believed that the filler material provides mechanical reinforcement to the permeable composition or controlled release product of the within invention. The mechanical filler material reinforcement may improve the strength and durability of the composition or product. As a result, the composition or product may be better able to withstand externally applied stresses, such as abrasive handling, thermal shock, etc.

Further, it is believed that the filler material may physically stabilize the permeable composition or controlled release product. In particular, it has been found that fibrous filler materials may substantially reduce the incidence and/or size of material defects resulting from inevitable material alterations, such as allotropic crystal conversion and/or thermally induced expansion and contraction of material crystals. Particularly in the case where the matrix material is comprised of sulphur (as discussed below), the physical stabilizing action exerted by filler material inclusions inhibits or minimizes the uncontrollable release mechanism (i.e.: cracks and defects) currently employed in applications such as sulphur coated fertilizers.

Finally, the filler material forms or facilitates the formation of the release control mechanism of the present invention. More particularly, the interfaces between the longitudinal surface area of the fibrous filler material and the matrix material provides passageways and/or sites for passageway formation. Once formed, these interfacial passageways serve as conduits for solvent transmission into the core of the composition or product. Where the substrate material is capable of dissolution or degradation, the interfacial passageways also serve as channels for the transmission of the substrate material.

As indicated, any organic, inorganic, natural or synthetic filler material may be used. For instance, the filler material may be comprised of one or a combination of the following (listed in no particular order): (1) inorganic (mineral) fillers such as wollastonite (calcium metasilicate), calcium metaphosphate fibers, asbestos, mica, talc, kaopolite, glass fibers, ceramic fibers (i.e.: alumina-silica fibers), vitreous fibers (i.e.: blast furnace slag fibers), basalt fibers or a combination thereof; (2) organic fillers such as plastic fibers (i.e.: polypropylene, polyethylene, polyvinyl alcohol, etc.), cotton, hemp or cellulose. In the preferred embodiment, the filler material is comprised of wollastonite. Wollastonite is a fibrous mineral comprised of acicular, calcium metasilicate ($CaSiO_3$) crystals.

The particular filler material is selected to be suitable for or compatible with the particular application of the invention. Factors affecting the selection of the filler material include, but are not limited to, the desired stability of the filler material, its environmental acceptability and cost effectiveness. Preferably, the filler material is thermally, chemically and physically stable upon contact with the matrix material and the method of production (i.e.: preferably, the filler does not substantially melt, volatilize, decompose, dissolve, disintegrate, etc., during its production or useful service life of the composition or product). The filler material is also preferably environmentally compatible with the intended application. Finally, the filler material cost is preferably compatible with the economics of the intended application.

It has been found that the following properties of the filler material may affect the release control mechanism, mechanical reinforcing abilities and stabilizing abilities of the present invention: (1) filler particle size (length×diameter/thickness); (2) filler particle aspect ratio (ratio of length to diameter/thickness); and (3) filler particle surface area. Any filler particle size, filler particle aspect ratio and filler particle surface area capable of producing a permeable composition having the desired properties may be utilized.

In the preferred embodiment the filler material is comprised of wollastonite. Table 1 provides a representative listing of commercially available wollastonite products which may be suitable for use as a filler material in the preferred embodiment of the invention. Table 1A includes wollastonite products which have actually been tested and have been found to be suitable for use as a filler material. Table 1B includes additional wollastonite products which are expected, because of their physical properties, also to be suitable for use as a filler material in the preferred embodiment of the invention.

The wollastonite products listed in Table 1 are all produced and sold by Nyco Minerals, Inc. or by its licensees or related companies.

Table 1 is not intended to provide an exhaustive list of suitable wollastonite products. Other wollastonite products produced and sold by Nyco Minerals, Inc. or by other producers of wollastonite may also be suitable for use in the invention.

TABLE 1A

Tested Wollastonite Filler Materials

| Example # | NYCO ® Product Names |
|---|---|
| 8 | NYAD ® M 100 |
| 9 | NYAD ® M 200 |
| 10 | NYAD ® M 325 |
| 11 | NYAD ® M 400 |
| 12 | NYAD ® M 1250 |

TABLE 1B

Potential Wollastonite Filler Materials

| Example # | NYCO ® Product Names |
|---|---|
| 1 | NYAD G ® |
| 2 | NYGLOS ® 20 |
| 3 | NYGLOS ® M15 |
| 4 | NYGLOS ® 12 |
| 5 | NYGLOS ® 8 |
| 6 | NYGLOS ® 5 |
| 7 | NYGLOS ® 4 |
| 13 | NYAD G ® Special |
| 14 | ULTRAFIBE ® 55 |
| 15 | NYCOR ® R |
| 16 | RRIMGLOS ™ I |
| 17 | RRIMGLOS ™ II |
| 18 | NYAD ® 200 |
| 19 | NYAD ® 325 |
| 20 | NYAD ® 400 |
| 21 | NYAD ® 475 |
| 22 | NYAD ® 1250 |
| 23 | NYGLOS ® M3 |
| 24 | NYGLOS ® M20 |
| 25 | NYGLOS ® M50 |
| 26 | NYAD ® M475 |

A filler material of any particle size, aspect ratio and surface area may be useful in the invention. More particularly, however, the range of preferable particle sizes, aspect ratios and surface areas may be classified according to a general preferred range, a more preferable range and a most preferable range as set out in Table 2. Although the ranges of Table 2 may be generally applicable to any filler material dispersed throughout any matrix material, the ranges have been found to be particularly applicable in the preferred embodiment in which the filler material is comprised of wollastonite and the matrix material is comprised of sulphur.

which is subsequently processed by image analysis software. The software defines the border of each image by setting a grayscale threshold value. The grayscale image is converted into a binary image. Corresponding screen pixels are then used to represent an "area" for each projected two-dimensional image of particles within the original field of view. Analysis tools then eliminate particles that are determined to be "crossed" or "touching". The remaining particles are then measured to determine maximum diameter (length) and minimum diameter (width). At least 1,000 and preferably 5,000 or more particles are typically analyzed for each sample. The results are then weighted by area and the mean average length, mean average diameter and mean average aspect ratio are determined. Suitable image analysis software suited is commercially available. Suitable image analysis systems are also commercially available.

An exemplary method for determining specific surface area utilizes a commercially available automated instrument (Micromeritics® ASAP 2000). In this method, the physical adsorption of an inert gas is conducted at a pressure which is within the range of linearity for derivation of specific surface area using the Brunauer, Emmet and Teller (BET) standard model for gas adsorption on particulate solids.

In general, the particle size of the filler material is preferably less than the thickness of the permeable composition. Larger filler sizes are potentially suitable for relatively large thicknesses of the permeable composition, while smaller filler sizes are generally more suited to relatively small thicknesses of the permeable composition. It may be desirable to reduce the weight (i.e.: thickness) of the permeable composition in order to maximize the value of the composition or product, which tends to be derived from the amount (by weight) of the substrate material (such as fertilizer) contained inside the composition or product.

TABLE 2

Ranges of Filler Particle Size, Aspect Ratio and Surface Area

| Parameter | Min/Max | General Preferred Range | More Preferable Range | Most Preferable Range |
|---|---|---|---|---|
| Average* Particle Diameter/Thickness Range (microns) | Minimum | <3 microns | 3 microns | 3 microns |
| | Maximum | >40 microns | 25 microns | 15 microns |
| Average* Particle Length Range (microns) | Minimum | <10 microns | 10 microns | 10 microns |
| | Maximum | >600 microns | 100 microns | 50 microns |
| Average* Particle Aspect Ratio Range | Minimum | <2:1 | 2:1 | 3:1 |
| | Maximum | >20:1 | 13:1 | 10:1 |
| Average* Particle Surface Area Range | Minimum | <1.5 m$^2$/cm$^3$ of specific filler volume | 4.5 m$^2$/cm$^3$ of specific filler volume | 6.0 m$^2$/cm$^3$ of specific filler volume |
| | Maximum | >15.0 m$^2$/cm$^3$ of specific filler volume | 15.0 m$^2$/cm$^3$ of specific filler volume | 15.0 m$^2$/cm$^3$ of specific filler volume |

*The average dimensions of particles of filler material may be determined by any suitable method as may be practiced in the art.

In an exemplary method for determining particle thickness, length and aspect ratio, average particle dimensions are determined by computerized analysis of images generated by an optical microscope equipped with a camera and an automated stage. A small amount of a sample to be analyzed is placed in a transparent container using an appropriate liquid for dispersal. A camera is then used to generate a digital signal It has further been found that the quantity of filler material present in the composition or product affects its release control mechanism, mechanical reinforcing abilities and stabilizing abilities. Any filler quantity capable of producing a permeable composition having the desired properties may be utilized. However, the range of preferable filler quantity may also be classified according to a general range, a preferable range and a most preferable range as set out in Table 3. Although the ranges of Table 3 may be generally applicable to any filler material dispersed throughout any matrix material, the ranges have been found to be particularly applicable in the preferred embodiment in which the filler material is comprised of wollastonite and the matrix material is comprised of sulphur.

TABLE 3

Suitable Ranges of Filler Quantity

|  | Minimum Quantity | Maximum Quantity |
|---|---|---|
| General Mass of Filler Required (by mass of matrix material) | 2% | 50% |
| General Volume of Filler Required (by volume of matrix material) | 1.4% | 34.5% |
| Preferable Mass of Filler Required (by mass of matrix material) | 5% | 30% |
| Preferable Volume of Filler Required (by volume of matrix material) | 3.5% | 20.7% |
| Most Preferable Mass of Filler Required (by mass of matrix material) | 10% | 20% |
| Most Preferable Volume of Filler Required (by volume of matrix material) | 6.9% | 13.8% |

However, the permeable composition may be comprised of more voluminous filler material having a lower specific gravity within a greater thickness of the composition or less voluminous filler material having a greater specific gravity within a smaller thickness of the composition. Therefore, the preferable ranges of filler quantities may be broadened. Accordingly, in the preferred embodiment, the general range of filler quantity is approximately 0.5% to 200% filler, by volume of matrix material. The preferable range of filler quantity is 1% to 120% filler, by volume of matrix material. The most preferable range of filler quantity is approximately 2% to 80% filler, by volume of matrix material.

As indicated, a degradable surface treatment material is preferably applied to the external surfaces of the particles of filler material. It is believed that the surface treatment of the particles of filler material facilitates the release control mechanism of the present invention and may facilitate compatibility of specific filler materials with specific matrix materials (i.e.: provides or improves filler dispersion). As well, in order for the filler material to be mechanically reinforcing, the surface treatment material also preferably provides for a transfer of any externally applied loads from the matrix material to the particles of filler material across the degradable interface, at least until such time that the interface in fact degrades.

Specifically, it is believed that the surface treatment material applied to the external surfaces of the particles of filler material initiates or enhances the formation of the interfacial passageways between the matrix material and the external surfaces of the particles of filler material. Thus, surface treatment refers to the application of a surface treatment material to the surface area of the particulate filler material. The surface treatment material is preferably soluble or degradable in the presence of a solvent or degradation process specific to the surface treatment.

More particularly, the surface treatment material provides degradable interfaces between the matrix material and the external surfaces of the particles of filler material. Thus, upon contact with an appropriate solvent or degradation agent, the surface treatment material is dissolved or degraded, thereby forming or enhancing the interfacial passageway between the longitudinal surface of the particles of filler material and the matrix material. The dissolution or degradation of the surface treatment material provides interfacial passageways where none would otherwise exist and/or augments those interfacial passageways that may already exist.

Therefore, the surface treatment material is believed to provide the primary element of control over the release rate of the substrate material. Accordingly, it is further believed that control over the release profile may be achieved by selection and variation of one or more of the factors described below.

First, the surface treatment material or materials may be selected to control the rate of formation or enhancement of the interfacial passageways. By selecting surface treatment materials of varied solubility or degradation properties, it is believed that adjustment of the surface treatment dissolution or degradation rate may be attained. Second, the thickness of the permeable composition may be selected to control the rate of formation or enhancement of the interfacial passageways. By adjusting the thickness, the length of the particles of filler material is varied proportionally. Consequently, the rate at which complete interfacial passageways are formed or enhanced along the surface of the filler particles may be controlled.

Third, the amount or dosage of the surface treatment material applied to the external surfaces of the particles of filler material may be selected to control the size of the interfacial passageways. Upon dissolution or degradation of the surface treatment material, a correlation between the amount of surface treatment material applied and the properties (i.e., size, effectiveness etc.) of the interfacial passageway may be observed. Fourth, the volume or amount of the surface treated filler material used may be selected to control the amount of interfacial passageways. By adjusting the amount of the surface treated filler material contained within the permeable composition, it is believed that the number of interfacial passageways induced or enhanced in the composition may be controlled. Finally, the volume of the total filler material may be selected to control the amount of interfacial passageways. In applications where greater durability and slower release are required, the extent of the surface treatment material applied to the particles of filler material may be adjusted. In such cases, the total filler material content may be increased to enhance durability and the amount of surface treated filler material may be reduced in order to achieve the desired release profile.

As indicated, the applied surface treatment material may also serve as a dispersing agent for the filler material. In certain applications, untreated filler material may not be readily dispersible in specific matrix materials. Inability to achieve filler dispersal may be a function of various interference mechanisms (i.e.: statically charged filler particles, poor matrix material wetting properties, etc.) In such cases, the surface treatment material and the dosage or amount are selected to not only initiate or enhance interfacial passageway formation, but to also render the filler material dispersible in the matrix material.

In certain applications where filler surface treatment is not specifically required for dispersal, the surface treatment of the filler material may result in substantially reducing the mixing effort required for dispersal. From a practical or production process standpoint, it may be desirable to select surface treatment materials and amounts or dosages which not only initiate or enhance interfacial passageway formation, but also improve dispersal of the filler material particles within the matrix material.

The surface treatment material may be comprised of any solid, liquid, organic, inorganic, natural or synthetic surface treatment agent capable of providing the desired degradable interfaces between the matrix material and the external surfaces of the particles of filler material. For example, the surface treatment material may be comprised of one or more of the following (listed in no particular order): aluminum sulphate; sodium lauryl sulphate; alkyl sulphates; substituted phenol ethoxy phosphate esters; hydrated lime; tridecyl alcohol ethoxylate; octylphenol ethoxylate; sorbitol monooleate ethoxylate; canola oil; sodium silicate; calcium chloride; sugar; potassium chloride; ammonium sulphate; naphthalene; butylnaphthalene; naphthalene sulphonate; calcium lignosulphonate; naphthalene sulphonate formaldehyde condensates; sodium alkyl benzene sulphonates; styrene butadiene; dairy products; polyoxyalkylene glycol ether; polypropylene glycol monobutyl ether; lecithin; polyvinyl alcohol; detergent and combinations thereof.

Preferably, the surface treatment material is water soluble so that the degradable interfaces degrade in the presence of water. In the preferred embodiment, the surface treatment material is comprised of a naphthalene sulphonate formaldehyde copolymer.

As indicated, the surface treatment material provides degradable interfaces, which interfaces may degrade through various actions such as dissolution, thermal decomposition, biological degradation, chemical decomposition, etc. Where the substrate material is also selected to degrade, the mode of surface treatment material degradation selected is typically the same as that required to degrade the substrate material. For example, in the case of substrate materials which are degradable through dissolution by a particular solvent, the surface treatment material selected is typically also soluble in the same solvent.

In addition to degradability, the surface treatment material is also preferably selected to provide one or more of the following further desirable properties to the composition or product of the present invention. First, the surface treatment material is preferably thermally, chemically and physically stable upon contact with the matrix material and the production method (i.e.: the surface treated filler material must not substantially melt, volatilize, decompose, dissolve, disintegrate, etc., during the production method). Second, in cases where the filler material could not otherwise be dispersed in a matrix material during production (due to electrostatic repulsion, surface tension effects, etc), the surface treatment material preferably renders the filler material compatible with the matrix material to provide filler dispersal. In cases where the filler material is difficult to disperse in the matrix material, the surface treatment material may be used to improve filler dispersal. Third, the surface treatment material is preferably environmentally compatible with the intended application. Fourth, the surface treatment material cost is preferably compatible with the economics of the intended application.

Finally, it is also generally desirable that the type of surface treatment material be compatible (i.e.: bondable) with the filler material and the matrix material for the purpose of maintaining the mechanical reinforcing properties of the filler material particles. Incompatible surface treatment materials may induce "slippage" along the filler material/matrix material interface, thereby reducing the filler material's mechanical reinforcing capability.

The quantity or dosage of the surface treatment material applied to the particles of filler material has been found to affect both the release control mechanism and dispersion of filler material in the present invention. Any amount, quantity or dosage of surface treatment material capable of producing a permeable composition having the desired properties may be utilized. However, the range of preferable amounts of surface treatment material may be classified according to a general range, a preferable range and a most preferable range as set out in Table 4. Although the ranges of Table 4 may be generally applicable, the ranges have been found to be particularly applicable in the preferred embodiment in which the filler material is comprised of wollastonite and the matrix material is comprised of sulphur. Further, the ranges have been further found to be particularly applicable in the preferred embodiment in which the surface treatment material is comprised of naphthalene sulphonate formaldehyde copolymer.

TABLE 4

Ranges of Amounts or Dosages of Surface Treatment Material

| | Minimum Quantity | Maximum Quantity |
|---|---|---|
| General Surface Treatment Material Mass Dosage Required (by mass of Filler Material) | 0.1% | 20% |
| General Surface Treatment Material Volume Dosage Required (surface treatment material volume/filler material surface area) | 0.0002 $cm^3/m^2$ | 0.04 $cm^3/m^2$ |
| Preferable Surface Treatment Material Mass Dosage Required (by mass of filler material) | 0.5% | 10% |
| Preferable Surface Treatment Material Volume Dosage Required (surface treatment material volume/filler material surface area) | 0.001 $cm^3/m^2$ | 0.02 $cm^3/m^2$ |
| Most Preferable Fiber Surface Treatment Mass Dosage Required (by mass of filler material) | 1% | 5% |
| Most Preferable Surface Treatment Material Volume Dosage Required (surface treatment material volume/filler material surface area) | 0.002 $cm^3/m^2$ | 0.01 $cm^3/m^2$ |

However, the permeable composition may be comprised of more voluminous surface treatment material having a lower specific gravity within a lower surface area filler material or less voluminous surface treatment material having a higher specific gravity within a higher surface area filler material. Therefore, the preferable ranges of surface treatment material quantities may be broadened. Accordingly, in the preferred embodiment, the general range of surface treatment material quantity is approximately 0.00005 $cm^3$ surface treatment material/$m^2$ of surface area of filler material to 0.6 $cm^3$ surface treatment material/$m^2$ of surface area of filler material. The preferable range of surface treatment material quantity is 0.0003 $cm^3$ surface treatment material/$m^2$ of surface area of filler material to 0.3 $cm^3$ surface treatment material/$m^2$ of surface area of filler material. The most preferable range of surface treatment material quantity is approximately 0.0005 $cm^3$ surface treatment material/$m^2$ of surface area of filler material to 0.1 $cm^3$ surface treatment material/$m^2$ of surface area of filler material.

As indicated above, the permeable composition of the present invention is comprised of an amount of a matrix material. In one aspect of the invention, the matrix material is comprised of a substrate material and a carrier material. In a further aspect of the invention, the permeable composition including the matrix material is used in coating a substrate material. Whether the matrix material is comprised of the substrate material or used for coating the substrate material, the matrix material acts as a carrier for the filler material. Specifically, the filler material is dispersed throughout the matrix material. Further, the matrix material facilitates the control release mechanism of the present invention. By increasing or decreasing the thickness or dimensions of the permeable composition comprised of the matrix material, the "length" of the interfacial passageways formed around individual particles of filler material or contiguously arranged particles of filler material is also increased or decreased. Therefore, the time required to degrade the surface treatment material may be increased or decreased as the thickness or dimensions of the permeable composition are varied.

As indicated, the matrix material is comprised of a carrier material in one aspect of the invention. Further, in all aspects of the invention, the matrix material acts as a carrier. Thus, the matrix material, and the carrier material, may be comprised of any organic, inorganic, natural or synthetic material or a combination thereof capable of acting as a carrier for the filler material and capable of facilitating the formation or enhancing the formation of the interfacial passageways. For example, suitable or preferred matrix materials and carrier materials are comprised of one or a combination of (listed in no particular order): polyurethane, polypropylene, polyethylene, latex, sulphur and resins. In the preferred embodiment, the matrix material is comprised of sulphur. Accordingly, where the matrix material is comprised of a carrier material, the carrier material is comprised of sulphur.

In the preferred embodiment the sulphur is preferably elemental sulphur, which is less expensive than chemically modified sulphur. Elemental sulphur also potentially offers more flexibility in designing the permeable composition, since the relative instability of elemental sulphur in comparison with chemically modified sulphur may be advantageous for avoiding the effects of "lock-off". In the short term, the inclusion of the filler material throughout the elemental sulphur matrix material will serve in the preferred embodiment to mechanically reinforce and physically stabilize the elemental sulphur, thus counteracting some of the potential disadvantages of using a relatively unstable matrix material.

The particular matrix material and carrier material selected will be dependent upon the desired properties of the permeable composition and/or controlled release product and the intended application thereof. Matrix material properties, including carrier material properties, may be governed by factors such as matrix material strength, permeability, cost and/or environmental/health acceptability. For example, sulphur is often used for fertilizer applications due to its relatively low cost and acceptability for eventual long-term degradation in the environment.

The thickness of the permeable composition, including the thickness of any coating layer of the permeable composition, has been found to affect the release control mechanism of the present invention. Any thickness of permeable composition, including any thickness of a coating layer thereof, capable of producing an end product having the desired properties may be utilized. However, the range of preferable thicknesses of permeable composition may be classified according to a general range and a preferable range as set out in Table 5. Although the ranges of Table 5 may be generally applicable, the ranges have been found to be particularly applicable in the preferred embodiment in which the filler material is comprised of wollastonite, the matrix material is comprised of sulphur and the surface treatment material is comprised of naphthalene sulphonate formaldehyde copolymer.

Further, the following ranges of thicknesses are particularly applicable where the permeable composition is applied to the substrate material in a coating layer. Specifically, the ranges set out in Table 5 are approximate and have been calculated from the applied sulphur coating weights, assuming a spherical coating substrate material with a diameter of 2.2 mm. Such a substrate material size is representative of many, but not all, prilled or granulated fertilizers.

TABLE 5

Ranges of Thickness of the Permeable Composition

|  | Minimum Value | Maximum Value |
|---|---|---|
| General Weight of Permeable Composition Applied to Substrate Material (%, by weight of coated product or substrate material) | 15% | 30% |
| General, Approximate Thickness Applied to Substrate Material (microns) | 45 microns | 90 microns |
| Preferable Weight of Permeable Composition Applied to Substrate Material (%, by weight of coated product or substrate material) | 15% | 25% |
| Preferable Approximate Thickness Applied to Substrate Material (microns) | 45 microns | 75 microns |

In general, it is desirable to minimize the weight or thickness of the permeable composition or coating layer for economic reasons. Matrix materials represent an additional material expense in production. Also, typically the value of the end product is directly related to the amount of valuable substrate material in the product, not the amount of matrix or carrier material (such as sulphur).

The invention may be utilized in other products, particularly coated products such as those using polymer coatings (including polymer coated fertilizers or pharmaceuticals) or very small granular substrate materials. In these applications, the coatings are generally applied much more thinly than shown above in Table 5. Therefore, the preferable ranges of thickness of a coating layer of the permeable composition may be broadened. Accordingly, in the preferred embodiment, the general range of thickness of the coating layer is approximately 2 to 100 microns and the preferable range of thickness of the coating layer is 20 to 75 microns.

Where the matrix material is comprised of the substrate material (rather than applying the matrix material as a coating on the substrate material), the dimensions of the permeable composition preferably range from prill/granules of approximately 1 mm (or less) to 5 mm. However, the invention may also be used in much larger products such fertilizer macrogranules, tablets or briquettes. Such products may range in size from 25 mm (or less) granules or tablets to 150 mm (or more) briquettes.

In the method aspect of the invention, the invention is directed at a method for producing the permeable composition and a method for producing the controlled release product. In either case, the application or product is first selected for use with the present invention. For example, as discussed above, suitable applications or products include those that require a cost-effective method of achieving controlled release properties (such as controlled release fertilizers).

Both of the methods include the steps for the production of the permeable composition. Specifically, the method is comprised of providing an amount of a particulate filler material, wherein each of the particles of filler material is comprised of an external surface, and applying an amount of a degradable surface treatment material to the external surfaces of the particles of filler material to form surface treated particles of filler material. The properties and parameters of the filler material and the surface treatment material are preferably as described above. Therefore, the filler material and the surface treatment material are selected according to their required or desired properties discussed previously. Further, the selected surface treatment material is applied to the surface area of the selected filler material at the required or desired amount or dosage as discussed previously, using any conventional or known mechanism or process suitable for applying surface treatment materials to particle surfaces.

Further, the method for producing the permeable composition is further comprised of dispersing the surface treated particles of filler material throughout an amount of a matrix material to form the permeable composition such that interfacial passageways between the matrix material and the external surfaces of the particles of filler material are defined by the surface treatment material and such that degradable interfaces between the matrix material and the externals surfaces of the filler material are provided by the surface treatment material. The properties and parameters of the matrix material are preferably as described above.

The dispersal step may be performed in any manner and using any mechanism suitable for dispersing the surface treated particles throughout the matrix material. For instance, any compatible mixing process or mixing apparatus may be used. Preferably, the surface treated particles are substantially uniformly dispersed or mixed throughout the matrix material by the dispersing step. In the preferred embodiment, the surface treated particles of filler material and the matrix material in fluid form (for example molten, emulsified, etc.) are mixed together using known or conventional means, mechanisms or processes. Further, the surface treated particles of filler material may undergo a pre-dispersal process or step where required to facilitate the subsequent dispersal of the particles in the matrix material. For instance, the surface treated particles of filler material may be pre-heated prior to the dispersing step in order to facilitate mixing the filler material with a thermoplastic or thermosetting matrix material.

In one aspect of the method for producing the permeable composition where the matrix material is comprised of the substrate material, the dispersing step is further comprised of dispersing the surface treated particles of filler material throughout the substrate material. The properties and parameters of the substrate material are preferably as described above. Further, the dispersal step may be performed in any manner and using any mechanism suitable for dispersing the surface treated particles of filler material throughout the matrix material including the substrate material. For instance, any compatible mixing process or mixing apparatus may be used. Preferably, the surface treated particles are substantially uniformly dispersed or mixed throughout the substrate material by the dispersing step. Further, the substrate material may undergo a pre-dispersal process or step where required to facilitate the subsequent dispersal of the particles of filler material in the substrate material. For instance, the substrate material may be pre-heated prior to the dispersing step in order to facilitate dispersal of the substrate material within the thermoplastic or thermosetting matrix material.

Finally, in this aspect of the method for producing the permeable composition, the method is preferably further comprised of the step of forming the permeable composition into discrete particles. The permeable composition may be formed into discrete particles having any desired dimensions or configuration using any known or conventional processes or mechanisms suitable or compatible for use with the particular permeable composition. For instance, the discrete particles of permeable composition may be formed by such techniques as prilling, granulating or extrusion.

In a further aspect of the method for producing the permeable composition where the matrix material is not comprised of the substrate material, the method may be further comprised of the step of applying the permeable composition to a substrate material in a coating layer. With respect to the method for producing a controlled release product, the method is comprised of the steps of providing the amount of the particulate filler material, applying the amount of the degradable surface treatment material to the external surfaces of the particles of filler material and dispersing the surface treated particles of filler material throughout the amount of the matrix material to form the permeable composition, all as described above. However, the method for producing the controlled release product is further comprised of the steps of providing a substrate material and applying the permeable composition to the substrate material in a coating layer to form the controlled release product. In either method, the properties and parameters of the substrate material and the coating layer are preferably as described above.

The permeable composition may be applied to the substrate material in a coating layer using any known or conventional processes or mechanisms suitable or compatible for use with the particular permeable composition and capable of achieving the desired coating layer. For instance, the coating layer may be applied using conventional techniques such as atomized coating applications.

Further, where applying a coating layer, the substrate material may undergo a pre-application process or step where required to facilitate the subsequent application of the permeable composition to the substrate material. For instance, the substrate material may be pre-treated with an application of a primer material selected to promote or facilitate the later adhesion of the coating layer of permeable composition to the substrate material.

Finally, with respect both the method for producing the permeable composition and the method for producing the controlled release product, the methods may further include additional processing steps, where desired or required, to achieve or produce the desired end product. For instance, the composition or the product may be subjected to cooling or curing steps or additional materials may be applied as further coatings.

A detailed description is provided below of the preferred embodiment of the invention in the production of sulphur coated fertilizers (SCF). SCF was selected as an example of the application of the invention given that conventional SCF tends to be a high-value, high volume product, which typically lacks the ability to achieve reliable, significant release control in a cost-effective fashion. Traditionally, release control in SCF is achieved via the application of costly polymer coatings applied over the primary sulphur coating or the use of expensive, chemical sulphur modifiers (sulphur plasticizers or stabilizers), which often posses only limited performance. Additionally, conventional SCF tends not to be mechanically durable, and thus has unreliable release properties.

In the preferred embodiment, the filler material is comprised of wollastonite (calcium metasilicate) for several reasons. First, the relatively high particle strength and high particle aspect ratios provide excellent reinforcement of a sulphur matrix. Significant variability in wollastonite particle size, aspect ratio and surface area also provides capacity for relatively significant release control and formation of interfacial passageways. Second, wollastonite has relatively high thermal stability, which makes it suitable for use in sulphur matrices, which are applied in molten form at temperatures in the approximately 130 to 160° C. temperature range. Third, wollastonite material cost is compatible with the economics of the production. Finally, wollastonite is an inert mineral, which is acceptable for use in agricultural applications.

Further, in the preferred embodiment, the surface treatment material for the wollastonite is comprised of a naphthalene sulphonate formaldehyde copolymer (nsf copolymer), in aqueous solution. Nsf copolymer was selected as the surface treatment material for several reasons. First, nsf copolymer is hydrophilic and water soluble, and is, therefore, degradable (soluble) in the presence of the fertilizer releasing agent (water). Nsf copolymer also effectively improves wollastonite particle dispersion in molten sulphur. Second, nsf copolymer is substantially stable at the temperatures used to apply molten sulphur coatings to fertilizers. Third, nsf copolymer material cost is compatible with the economics of SCF production. Finally, the use of nsf copolymer is accepted in agricultural applications.

In the preferred embodiment, the nsf copolymer is applied to the external surfaces of the particles of wollastonite filler material using the following process regime. First, the wollastonite is pre-heated in order to facilitate a nsf copolymer coating over substantially the entire surface area of the wollastonite particles. The wollastonite is preferably pre-heated to a temperature range of about 60 to 90° C. (most preferably about 70-80° C.). Second, the surface treatment material, or nsf copolymer, is also pre-heated. The required amount of nsf copolymer, in aqueous solution and in the dosages discussed previously, is preferably heated to a temperature range of about 50-70° C. (most preferably about 60 to 70° C.). Water may be added to the nsf copolymer solution in order to dilute the surface treatment material, thereby facilitating complete coverage of the wollastonite particles.

Third, in a suitable surface treatment mixer/agitator, the pre-heated wollastonite is sprayed with the heated surface treatment material solution and subjected to high-shear mixing. Suitable surface treatment agitators (such as pugmills, ribbon mixers, etc) are utilized. Agitation/mixing action must be sufficient to disperse the surface treatment material or nsf copolymer over the surface area of the wollastonite particles, however the agitation action must not be so intense as to damage or break the wollastonite particles. In the preferred embodiment, this was accomplished using a 1 kg capacity, table-top, rotating paddle-mixer with an agitation speed ranging from about 60 to 150 rpm (preferably about 90 to 120 rpm). The mixture of wollastonite and nsf copolymer is agitated for approximately 15 to 30 minutes. The mixture temperature is maintained in the temperature range of about 50 to 70° C. during the surface treatment process.

Fourth, the surface treated wollastonite is removed from the agitator/mixer and allowed to air-dry under ambient conditions for approximately 24 hours. The wollastonite is thinly spread-out and periodically agitated by hand, during drying. Finally, as the surface treatment solution dries, the wollastonite particles may become agglomerated. In order to break-up any particle clusters, the dried surface treated wollastonite particles are agitated with a paddle mixer at approximately 60 rpm for approximately 10 minutes.

Once the permeable composition is prepared as described above, the preferred embodiment of the controlled release product is prepared as follows. First, the substrate material or fertilizer granules are prepared by pre-heating them to a temperature range of about 70-90° C. (preferably approximately 80° C.). Further, if necessary, fertilizer priming may be performed. In order to improve or facilitate bonding between the permeable composition (sulphur/surface treated particles of wollastonite) and the substrate material (fertilizer granules), the fertilizer granules may be "primed" (i.e.: coated) with a relatively thin layer of elemental sulphur. The molten elemental sulphur possesses a lower viscosity than the molten sulphur/surface treated wollastonite particle mixture and, therefore, tends to adhere better to the fertilizer substrate. The elemental sulphur primer may be applied in low quantities of about 2 to 10%, by weight of the final, coated fertilizer product or controlled release product (preferably 4 to 7%, by weight of the final fertilizer coated product). The coating regime for elemental sulphur "priming" is the same as that described below for the application of the coating layer of the permeable composition to the substrate material.

Second, the surface treated particles of wollastonite filler material are pre-heated in order to facilitate mixing of the surface treated wollastonite particles with molten sulphur matrix material. The surface treated wollastonite particles are pre-heated to a temperature in a range of about 130 to 145° C.

Third, the pre-heated, surface treated wollastonite is added to the molten sulphur at the required quantity, ass discussed previously. The wollastonite particles and sulphur may be mixed together using any conventional high-shear mixing means (such as pneumatic agitators). Mixing is preferably performed until the wollastonite is substantially fully dispersed and a substantially homogeneous mixture is achieved.

Fourth, a coating layer of the permeable composition (sulphur/surface treated wollastonite particles) is applied to the substrate material. The application of the sulphur/surface treated wollastonite particle coating to the fertilizer substrate is consistent with conventional or known techniques for applying elemental sulphur coatings to fertilizers. However, adjustments to the conventional sulphur coating regime are typically required due to the presence of the wollastonite particles in the coating mixture. The following coating application process description is applicable to the application of sulphur/surface treated wollastonite particle coatings to fertilizer granules.

Using any conventional granule fluidizing means (such as a rotating drum), the fertilizer granules are fluidized (i.e.: a moving bed, sheet, etc of fertilizer granules is induced). The degree of granule fluidization must be sufficient to adequately expose the discrete fertilizer granules to an applied coating mixture spray. The coating mixture is then delivered to the fertilizer granules. In particular, the molten sulphur/surface treated wollastonite mixture is pumped via conventional means to a series of conventional, fluid atomizing nozzles. The nozzles are equipped with sufficient orifice size and mechanical clean-out capabilities (i.e.: orifice needles) to prevent or inhibit plugging of the nozzles by the wollastonite particles.

Via the atomizing nozzles, the molten sulphur/surface treated wollastonite coating mixture fluid stream is contacted with atomizing air at a sufficient flow rate and pressure to atomize (produce discrete droplets) the coating mixture fluid stream. The air must also be heated to prevent freezing of the molten coating mixture fluid stream during atomizing. As the molten, atomized coating mixture droplets are sprayed from the atomizing nozzles, they strike the fluidized granule bed and spread over the surface of the discrete fertilizer granules before freezing. As a system of atomized coating mixture droplets coalesce and freeze on the granule surface, a uniform sulphur/surface treated wollastonite coating is formed.

The following detailed coating application regime, as set out in Table 6, is applicable to bench-scale production of the preferred embodiment of the controlled release product of the within invention having a sulphur/surface treated wollastonite coating.

TABLE 6

Bench Scale Process Regime for the Application of Sulphur/Surface Treated Wollastonite Coatings to Fertilizer Granules

| General Regime Parameters | Specific Regime Variables | Regime Variable Value |
|---|---|---|
| Fertilizer Granule Fluidizing | Fertilizer Amount | 5 kg |
| | Fluidizing Drum Length | 3 ft. |
| | Fluidizing Drum Diameter | 2 ft. |
| | Fluidizing Drum Rotation Speed | 20 to 50 rpm |
| Coating Mixture Delivery | Coating Mixture Flowrate | 2 to 6 gph |
| | Coating Mixture Flow Pressure | 10 to 30 psi |
| | Coating Mixture Temperature | 140 to 160° C. |
| Coating Mixture Atomizing | Atomizing Air Flowrate | 1 to 5 cfm |
| | Atomizing Air Flow Pressure | 20 to 70 psi |
| | Atomizing Air Flow Temperature | 140 to 170° C. |

Once the permeable composition coating layer is applied, the controlled release product may be cooled using conventional air cooling means. Further, although not required, additional coatings may be applied over the permeable composition coating layer, such as polymeric sealants. If desired, such additional coatings may be applied for the purpose of additional release control, product coloration, etc.

TEST RESULTS—EXAMPLE ONE

Various tests have been conducted on the preferred embodiment of the controlled release product of the present invention, including assessments of durability, controlled release characteristics and dispersal. Test results related to these technological elements are presented, following a description of the test specimen preparation.

In order to facilitate analysis, the specimens in Example 1 were prepared as "macro-granules" having a granule size larger than typical fertilizers.

Test Specimen Preparation Procedure

The test specimens are prepared as follows:
1. Urea specimens 13 mm in diameter are cast from molten urea, cooled and weighed. The surfaces of the specimens are inspected to ensure no significant defects (i.e.: holes, dents, etc.) are present.
2. Coating additives are heated to approximately 140° C., prior to mixing with sulphur at 130-140° C. The mix temperature is adjusted to 135-140° C., if necessary.
3. The cooled urea specimens are dipped in the coating mixture.
4. The coated specimens are cooled, weighed and the % coating weight is calculated:

$$\% \text{ Coating Weight} = \frac{\text{mass of coating}}{\text{mass of coating} + \text{mass of urea}} \times 100$$

5. Test coats are performed prior to specimen coating to ensure the amount of coating additive results in an average % coating weight between 20-22%. The applied coating weight is determined by the viscosity of the coating mix.

Holding the sulphur temperature constant, the amount of coating additive is adjusted to ensure the coating weight is consistent for all test groups.

6. Those specimens possessing a % coating weight outside a range of 19-25% are rejected.

Durability Testing

The durability testing was performed as follows:
1. Five coated specimens are weighed.
2. The specimens are added to the durability tester, which consists of a shaker capable of holding the samples and a ceramic impact charge. The mass ratio of impact charge to specimens is 42:1.
3. The specimens are shaken for 10 minutes, thereby subjecting the coatings to violent collisions with the ceramic impact charge.
4. The urea specimens and any coating remaining on the specimens are weighed.

The specimens are inspected to ensure no significant loss of urea substrate has occurred and the % coating loss is calculated:

$$\% \text{ Coating Loss} = \frac{\text{initial mass of specimens} - \text{mass of specimens after test}}{\text{initial mass of coating on specimens}} \times 100$$

In addition to a control test of specimens coated with pure sulphur, durability testing for Example 1 was conducted on specimens coated with sulphur and non-fibrous fillers, and specimens coated with sulphur and fibrous fillers, as set out in Table 7.

TABLE 7

Durability Testing Program

| Test # | Coating Inclusion | Coating Inclusion Content In Coating (%, by weight of sulphur) |
|---|---|---|
| 1 | None (control sulphur coat) | Not Applicable |
| 2 | Fine Silica Sand (Non-Fiber) | 15% |
| 3 | Ground Expanded Shale (Non-Fiber) | 15% |
| 4 | Powdered Carbon (Non-Fiber) | 15% |
| 5 | Wollastonite (Fiber) | 15% |
| 6 | Muscovite Mica (Fiber or Plate) | 12%* |
| 7 | Cellulose (w/kaolin) (Fiber) | 2.5%* |

In some cases less than 15%, by weight of sulphur, coating additive resulted in the maximum permissible average coating weight of 22%. Such tests are denoted with an asterisk. All test specimen sets possessed similar average coating weights in the 20 to 22% range.

FIG. 1 provides a graph of the durability test results for Example 1. As is evident from the durability test results, fibrous filler material inclusions improve the physical durability of sulphur based coatings. Of the fibrous filler materials tested to date, wollastonite inclusions were found to induce the most substantial improvement in sulphur based coating durability. Therefore, it is observed that fibrous filler materials provide reinforcement of sulphur coatings.

Further, as is evident from the durability test results, the addition of fibrous filler materials to sulphur based coatings results in greater coating durability than is possessed by those coatings containing non-fibrous filler materials. Therefore, it is observed that fibrous filler materials possess greater reinforcing properties than non-fibrous filler materials (i.e.: materials without a particulate aspect ratio).

Release Control Testing

The release control testing was performed as follows:
1. Five coated specimens of known urea content are each placed in 200 ml of water at 15-20° C.
2. After 4 hours of submersion each urea specimen is removed from water and assessed for mass loss. The assessment involves determining loss of the urea substrate (via dissolution) by pressing on the coating. Any specimens that rupture are dried and weighed. The total % urea released is calculated:

$$\% \text{ urea released} = \frac{\text{initial specimen mass} - \text{ruptured specimen mass}}{\text{initial urea mass}} \times 100$$

3. Ruptured specimens are removed from the testing program.
4. Remaining specimens are placed in water again and the amount of urea release is assessed every 15 hours thereafter.

In agriculture applications, the releasing solvent is generally water. Therefore, for the purposes of controlled release testing, hydrophilic substances have been selected as appropriate surface treatment materials. Based on positive coating durability results, controlled release testing has been conducted primarily on wollastonite. However, a test series for muscovite mica ($KAl_3Si_3O_{10}(OH)_2$) was also conducted in order to verify the release control technique. Mica is comprised of thin, alumino-silicate plates. The release control testing program for Example 1 is set out in Table 8.

Although FIG. 2, FIG. 3 and FIG. 4 are based upon somewhat limited data, a number of possible trends can be ascertained from the data.

First, as indicated by the Figures, specimens coated with sulphur and untreated wollastonite or sulphur and untreated muscovite mica released urea much more slowly than specimens coated with pure sulphur. Therefore, it is observed that fibrous filler inclusions within sulphur are capable of physically stabilizing sulphur. By substantially reducing the incidence and/or size of coating defects at the crystal level, the uncontrollable release mechanism employed by conventional sulphur coatings (i.e.: the defects) is observed to be substantially reduced. The formation of defects at the crystal level is potentially minimized via further adjustment of the filler material content in the coating or permeable composition.

Second, as indicated by the Figures, specimens coated with sulphur and untreated wollastonite released urea at a different rate than specimens coated with sulphur and untreated muscovite mica. Therefore, it is observed that a degree of control over sulphur crystal imperfection formation can be achieved via filler selection.

Third, as indicated by the Figures, specimens coated with a matrix of sulphur and surface treated wollastonite released urea at a faster rate than specimens coated with a matrix of sulphur and untreated wollastonite. Therefore, it is observed that appropriate surface treatment of fibrous filler materials initiates interfacial passageway formation and/or enhances existing interfacial passageways between the longitudinal surface area of the filler particles and matrix material.

Fourth, as indicated by the Figures, specimens coated with sulphur and fibrous fillers with higher surface treatment dosages released urea at a faster rate than specimens coated with sulphur and fibrous fillers with lower surface treatment dos-

TABLE 8

Release Control Testing Program

| Test # | Filler Material Tested | Surface Treatment Material | Surface Treatment Dosage (%, by weight of filler) | Filler Dosage in Coating (%, by weight of sulphur) |
|---|---|---|---|---|
| 8 | None (control sulphur coat) | Not Applicable | Not Applicable | Not Applicable |
| 9 | Wollastonite | None | Not Applicable | 15% |
| 10 | Wollastonite | Sugar | 2% | 15% |
| 11 | Wollastonite | Sugar | 5% | 15% |
| 12 | Wollastonite | Sugar | 10% | 15% |
| 13 | Wollastonite | Sulphonate | 2% | 15% |
| 14 | Wollastonite | Sulphonate | 5% | 15% |
| 15 | Muscovite Mica | None | Not Applicable | 12%* |
| 16 | Muscovite Mica | Aluminum Sulphate | 5% | 12%* |
| 17 | Muscovite Mica | Aluminum Sulphate | 10% | 12%* |

*Maximum filler content before 22% coating weight was exceeded.

Relating to Example 1:
1. FIG. 2 provides a graph of the release control test results for the wollastonite sugar treatment series;
2. FIG. 3 provides a graph of the release control test results for the wollastonite sulphonate treatment series; and
3. FIG. 4 provides a graph of the release control test results for the muscovite mica aluminum sulphate treatment series.

ages. Therefore, it is observed that adjustment of the surface treatment dosage provides a facet of control over the release profile.

Fifth, as indicated in FIG. 4, specimens coated with a matrix of sulphur and surface treated muscovite mica released urea at a faster rate than specimens coated with a matrix of sulphur and untreated muscovite mica. FIG. 4 further suggests the potential significance of choice of filler material, since muscovite mica arguably exhibits tendencies toward "lock off" when incorporated into a permeable composition in a similar manner to wollastonite. This in turn suggests that different filler materials may require different designs for the permeable composition in order to achieve the same desired properties.

Filler Dispersion Testing

The filler dispersion testing for Example 1 was performed as follows:

1. During durability and release control testing specimen preparation, the dispersal properties of the filler material in molten sulphur were observed and qualitatively assessed.
2. Filler dispersion was qualitatively rated as poor, fair, good or very good.

Filler dispersal assessments were conducted on the fibrous fillers tested for release control, as set out above. The filler dispersion test results for Example 1 are set out in Table 9.

TABLE 9

Qualitative Assessment of Filler material Dispersal in Sulphur

| Test # | Filler Material Tested | Surface Treatment Material | Surface Treatment Dosage (%, by weight of filler material) | Dispersal Rating |
|---|---|---|---|---|
| 18 | Wollastonite | None | Not Applicable | Poor |
| 19 | Wollastonite | Sugar | 2% | Poor |
| 20 | Wollastonite | Sugar | 5% | Fair |
| 21 | Wollastonite | Sugar | 10% | Fair |
| 22 | Wollastonite | Sulphonate | 2% | Good |
| 23 | Wollastonite | Sulphonate | 5% | Very Good |
| 24 | Muscovite Mica | None | Not Applicable | Good |
| 25 | Muscovite Mica | Aluminum Sulphate | 5% | Very Good |
| 26 | Muscovite Mica | Aluminum Sulphate | 10% | Very Good |

First, as is evident from the dispersal assessment, untreated muscovite mica possessed better dispersal properties in sulphur than untreated wollastonite. Therefore, it is observed that various fibrous fillers possess differing dispersal properties in molten sulphur.

Second, as is evident from the dispersal assessment, various surface treatments (of similar dosages) imparted differing dispersal properties to wollastonite. Therefore, it is observed that surface treatment material selection can be used to improve the dispersal of treated fibrous fillers in molten sulphur.

Finally, as is evident from the dispersal assessment, surface treated filler dispersal properties in sulphur varied with surface treatment dosage. Therefore, it is observed the surface treatment dosage can be used to improve the dispersal of treated fillers in molten sulphur.

TEST RESULTS—EXAMPLE TWO

Urea is high-value, nitrogen fertilizer possessing the highest content of nitrogen commonly commercially available in a solid, granular form (46% nitrogen, by weight). Utilizing the aforementioned invention elements and invention process regime, the sulphur coated urea (SCU) product set out in Table 10 was produced on a bench-scale.

The SCU product of Example 2 was prepared having a granule size comparable with a typical fertilizer to facilitate comparison with typical fertilizers.

TABLE 10

Example Composition of SCU Product Produced

| Composition Parameter | Composition Parameter Value |
|---|---|
| Fertilizer Substrate Utilized | Urea |
| Quantity of Sulphur Primer Utilized | 5%, by total weight of coated product |
| Quantity of Sulphur/Surface Treated Wollastonite Coating Applied | 15%, by total weight of coated product |
| Quantity of Surface Treated Wollastonite in Coating | 15%, by weight of sulphur. |
| Wollastonite Particles | NYAD ® M 1250 |
| Wollastonite Surface Treatment Material | nfs copolymer |
| Wollastonite Surface Treatment Material Dosage | 3%, by weight of Wollastonite |

The SCU product with the above composition was subjected to assessments of its controlled release properties and its mechanical durability. With regards to controlled release testing, the SCU product was tested relative to a commercially available polymer coated urea product (PCU) (control). PCU products in general are among the best performing and highest value controlled release fertilizer (CRF) products available on the market. The PCU product tested possessed a "200 day release claim." Such claims are typically established using field trials designed to measure the CRF's sustained releasing action under field conditions. For the purposes of this evaluation however, an accelerated laboratory testing procedure was used to assess the release profile of the SCU product, relative to the 200 day release claim PCU product.

The controlled release testing results for Example 2 are provided in FIG. 5. The SCU product exhibited a nitrogen release profile close to that of a substantially more expensive, commercially available PCU product with a 200 day release claim. Therefore, the ability of the invention to produce a product with controlled release properties is verified.

With regards to mechanical durability, the SCU product's mechanical durability was assessed relative to two commercially available SCU products (controls). The SCU control products also possessed additional product coatings over the primary sulphur coating, in the form of polymeric (wax) coatings.

The mechanical durability of the SCU products was assessed using a laboratory procedure, which subjects the SCU to abrasive handling procedures, as follows:

1. 100 g of fertilizer sample is dropped down an 11-ft PVC tube, into a metal container. The coated granules are subjected to violent collisions with the walls of the container and each other.
2. The sample drop is repeated 9 more times, for a total sample drop of 10 times.
3. 15 g of the mechanically stressed sample is then submersed in 15° C. water for 24 hours.
4. The sample is then removed from the water, dried and weighed. The mass of urea dissolved is used to calculate the % urea released, after abrasion.

The mechanical durability test results for Example 2 are provided in FIG. 6 and Table 11 below.

TABLE 11

Mechanical Durability Test Results

| Description | % urea release before abrasion (%, by mass) | % urea release after abrasion (%, by mass) |
|---|---|---|
| Commercial SCU No. 1 (with polymer wax overcoat) | 58 | 91 |
| Commercial SCU No. 2 (with polymer wax overcoat) | 27 | 57 |
| SCU (utilizing the within invention) | 17 | 34 |

The SCU product produced with the invention exhibited superior mechanical durability, as compared to two commercially available SCU products possessing additional coating materials. Therefore, the ability of the invention to produce a mechanically durable (i.e.: reliable) product with controlled release properties is verified.

TEST RESULTS—EXAMPLE THREE

Utilizing the sulphur coated urea (SCU) product described in Table 10 above as a "control," a number of factors potentially affecting the controlled release properties of the SCU product were varied as set out in Table 12 below. For each product described in Table 12, the primer coating weight was fixed at approximately 5%, by total weight of the product. Only the weight of the coating of the permeable composition was reduced where indicated in Test #4.

The results of varying the factors on the controlled release properties of the SCU product of Example 3 are also set out in Table 12 and FIG. 7.

TABLE 12

Assessment of Release Control Factors

| Test # | Description or Variable Tested | Wollastonite Content (%, by weight of sulphur) | Surface Treatment Material Dosage (%, by weight of wollastonite) | Coating Weight (%, by total weight of product) | Urea Released after 1 day static dissolution (%, by mass) |
|---|---|---|---|---|---|
| 1 | Control | 15 | 3 | 20 | 17 |
| 2 | Wollastonite Content in Coating (decreased relative to control - test 1) | 5 | 3 | 20 | 32 |
| 3 | Surface Treatment Material Dosage (increased relative to control - test 1) | 15 | 5 | 20 | 36 |
| 4 | Total Coating Weight (i.e. thickness) (decreased relative to control - test 1) | 15 | 3 | 16 | 42 |

The invention claimed is:

1. A controlled release product comprising:
   (a) a substrate material for release to a surrounding environment;
   (b) a composition coating the substrate material in a coating layer for providing a controlled release of the substrate material, the composition comprising:
      (i) an amount of a matrix material;
      (ii) an amount of a particulate fibrous filler material dispersed throughout the matrix material, wherein each of the particles of filler material is comprised of an external surface; and
      (iii) a water soluble surface treatment material applied to the external surfaces of the particles of filler material such that the surface treatment material provides degradable interfaces between the matrix material and the external surfaces of the particles of filler material, and wherein the degradable interfaces are degradable in the presence of water such that interfacial passageways between the matrix material and the external surfaces of the particles of filler material are formed by the dissolution of the surface treatment material.

2. The product as claimed in claim 1 wherein the substrate material is comprised of a fertilizer.

3. The product as claimed in claim 1 wherein the matrix material is comprised of sulphur.

4. The product as claimed in claim 2 wherein the matrix material is comprised of sulphur.

5. The product as claimed in claim 1 wherein the filler material is comprised of wollastonite.

6. The product as claimed in claim 2 wherein the filler material is comprised of wollastonite.

7. The product as claimed in claim 3 wherein the filler material is comprised of wollastonite.

8. The product as claimed in claim 4 wherein the filler material is comprised of wollastonite.

9. The product as claimed in claim 1 wherein the surface treatment material is comprised of a naphthalene sulphonate formaldehyde copolymer.

10. The product as claimed in claim 5 wherein the surface treatment material is comprised of a naphthalene sulphonate formaldehyde copolymer.

11. The product as claimed in claim 7 wherein the surface treatment material is comprised of a naphthalene sulphonate formaldehyde copolymer.

12. The product as claimed in claim 8 wherein the surface treatment material is comprised of a naphthalene sulphonate formaldehyde copolymer.

13. The product as claimed in claim 5 wherein the wollastonite has an aspect ratio greater than 1.

14. The product as claimed in claim 5 wherein the wollastonite has a particle width of between about 3 microns and about 40 microns.

15. The product as claimed in claim 5 wherein the wollastonite has a particle length of between about 10 microns and about 600 microns.

16. The product as claimed in claim 5 wherein the wollastonite has a particle surface area of between about 1 $m^2/cm^3$ and about 15 $m^2/cm^3$.

17. The product as claimed in claim 5 wherein the amount of surface treatment material applied to the external surfaces of the wollastonite is between about 0.00005 $cm^3$ of surface treatment material/$m^2$ of surface area of wollastonite and about 0.6 $cm^3$ of surface treatment material/$m^2$ of surface area of wollastonite.

18. The product as claimed in claim 5 wherein the amount of wollastonite dispersed throughout the matrix material is between about 0.5 percent and about 200 percent by volume of wollastonite to volume of matrix material.

19. The product as claimed in claim 7 wherein the wollastonite has an aspect ratio greater than 1.

20. The product as claimed in claim 7 wherein the wollastonite has a particle width of between about 3 microns and about 40 microns.

21. The product as claimed in claim 7 wherein the wollastonite has a particle length of between about 10 microns and about 600 microns.

22. The product as claimed in claim 7 wherein the wollastonite has a particle surface area of between about 1 $m^2/cm^3$ and about 15 $m^2/cm^3$.

23. The product as claimed in claim 7 wherein the amount of surface treatment material applied to the external surfaces of the wollastonite is between about 0.00005 $cm^3$ of surface treatment material/$m^2$ of surface area of wollastonite and about 0.6 $cm^3$ of surface treatment material/$m^2$ of surface area of wollastonite.

24. The product as claimed in claim 7 wherein the amount of wollastonite dispersed throughout the matrix material is between about 0.5 percent and about 200 percent by volume of wollastonite to volume of matrix material.

25. The product as claimed in claim 1 wherein the coating layer has a thickness of between about 2 microns and about 100 microns.

26. The product as claimed in claim 5 wherein the coating layer has a thickness of between about 2 microns and about 100 microns.

27. The product as claimed in claim 7 wherein the coating layer has a thickness of between about 2 microns and about 100 microns.

28. The product as claimed in claim 8 wherein the coating layer has a thickness of between about 2 microns and about 100 microns.

29. A method for producing a controlled release product, the method comprising the steps of:
   (a) providing an amount of a particulate fibrous filler material, wherein each of the particles of filler material is comprised of an external surface;
   (b) applying an amount of a water soluble surface treatment material to the external surfaces of the particles of filler material to form surface treated particles of filler material;
   (c) dispersing the surface treated particles of filler material throughout an amount of a matrix material to form a composition for providing a controlled release of a substrate material and such that degradable interfaces between the matrix material and the external surfaces of the particles of filler material are provided by the surface treatment material, wherein the degradable interfaces are degradable in the presence of water such that interfacial passageways between the matrix material and the external surfaces of the particles of filler material are formed by the dissolution of the surface treatment material;
   (d) providing a the substrate material for release to a surrounding environment; and
   (e) applying the composition to the substrate material in a coating layer to form the controlled release product.

30. The method as claimed in claim 29 wherein the substrate material is comprised of a fertilizer.

31. The method as claimed in claim 29 wherein the matrix material is comprised of sulphur.

32. The method as claimed in claim 30 wherein the matrix material is comprised of sulphur.

33. The method as claimed in claim 29 wherein the filler material is comprised of wollastonite.

34. The method as claimed in claim 30 wherein the filler material is comprised of wollastonite.

35. The method as claimed in claim 31 wherein the filler material is comprised of wollastonite.

36. The method as claimed in claim 32 wherein the filler material is comprised of wollastonite.

37. The method as claimed in claim 29 wherein the surface treatment material is comprised of a naphthalene sulphonate formaldehyde copolymer.

38. The method as claimed in claim 33 wherein the surface treatment material is comprised of a naphthalene sulphonate formaldehyde copolymer.

39. The method as claimed in claim 35 wherein the surface treatment material is comprised of a naphthalene sulphonate formaldehyde copolymer.

40. The method as claimed in claim 36 wherein the surface treatment material is comprised of a naphthalene sulphonate formaldehyde copolymer.

41. The method as claimed in claim 33 wherein the wollastonite has an aspect ratio greater than 1.

42. The method as claimed in claim 33 wherein the wollastonite has a particle width of between about 3 microns and about 40 microns.

43. The method as claimed in claim 33 wherein the wollastonite has a particle length of between about 10 microns and about 600 microns.

44. The method as claimed in claim 33 wherein the wollastonite has a particle surface area of between about 1 $m^2/cm^3$ and about 15 $m^2/cm^3$.

45. The method as claimed in claim 33 wherein the surface treatment material is applied to the external surfaces of the wollastonite such that the amount of surface treatment material is between about 0.00005 $cm^3$ of surface treatment material/$m^2$ of surface area of wollastonite and about 0.6 $cm^3$ of surface treatment material/$m^2$ of surface area of wollastonite.

46. The method as claimed in claim 33 wherein the wollastonite is dispersed throughout the matrix material such that the amount of wollastonite is between about 0.5 percent and about 200 percent by volume of wollastonite to volume of matrix material.

47. The method as claimed in claim 35 wherein the wollastonite has an aspect ratio greater than 1.

48. The method as claimed in claim 35 wherein the wollastonite has a particle width of between about 3 microns and about 40 microns.

49. The method as claimed in claim 35 wherein the wollastonite has a particle length of between about 10 microns and about 600 microns.

50. The method as claimed in claim 35 wherein the wollastonite has a particle surface area of between about 1 $m^2/cm^3$ and about 15 $m^2/cm^3$.

51. The method as claimed in claim 35 wherein the surface treatment material is applied to the external surfaces of the wollastonite such that the amount of surface treatment material is between about 0.00005 $cm^3$ of surface treatment material/m² of surface area of wollastonite and about 0.6 cm³ of surface treatment material/m² of surface area of wollastonite.

52. The method as claimed in claim 35 wherein the wollastonite is dispersed throughout the matrix material such that the amount of wollastonite is between about 0.5 percent and about 200 percent by volume of wollastonite to volume of matrix material.

53. The method as claimed in claim 29 wherein the applying step applies the coating layer having a thickness of between about 2 microns and about 100 microns.

54. The method as claimed in claim 33 wherein the applying step applies the coating layer having a thickness of between about 2 microns and about 100 microns.

55. The method as claimed in claim 35 wherein the applying step applies the coating layer having a thickness of between about 2 microns and about 100 microns.

56. The method as claimed in claim 36 wherein the applying step applies the coating layer having a thickness of between about 2 microns and about 100 microns.

* * * * *